(12) United States Patent
Dispensa et al.

(10) Patent No.: US 8,332,464 B2
(45) Date of Patent: Dec. 11, 2012

(54) SYSTEM AND METHOD FOR REMOTE NETWORK ACCESS

(75) Inventors: Steve Dispensa, Leawood, KS (US); Matt Miller, Overland Park, KS (US); Wayne Schroeder, Lenexa, KS (US); Jason Sloderbeck, Overland Park, KS (US)

(73) Assignee: ANXeBusiness Corp., Southfield, MI (US)

( * ) Notice: Subject to any disclaimer, the term of this patent is extended or adjusted under 35 U.S.C. 154(b) by 934 days.

(21) Appl. No.: 10/737,200

(22) Filed: Dec. 15, 2003

(65) Prior Publication Data

US 2006/0031407 A1    Feb. 9, 2006

Related U.S. Application Data

(60) Provisional application No. 60/433,059, filed on Dec. 13, 2002.

(51) Int. Cl.
*G06F 15/16* (2006.01)

(52) U.S. Cl. .................. 709/203; 709/229; 709/250

(58) Field of Classification Search ............. 709/200, 709/202, 203, 217, 219, 227
See application file for complete search history.

(56) References Cited

U.S. PATENT DOCUMENTS

| | | | |
|---|---|---|---|
| 6,038,594 A | 3/2000 | Puenta et al. | |
| 6,055,575 A | 4/2000 | Paulsen et al. | |
| 6,266,681 B1 | 7/2001 | Guthrie | |
| 6,487,538 B1 | 11/2002 | Gupta et al. | |
| 6,687,745 B1 | 2/2004 | Franco et al. | |
| 6,772,200 B1* | 8/2004 | Bakshi et al. | 709/217 |
| 6,795,851 B1 | 9/2004 | Noy | |
| 7,412,486 B1 | 8/2008 | Petrack et al. | |
| 7,430,757 B1 | 9/2008 | Chari et al. | |
| 2002/0002636 A1 | 1/2002 | Vange et al. | |
| 2002/0029350 A1 | 3/2002 | Cooper et al. | |
| 2002/0032501 A1 | 3/2002 | Tilles et al. | |
| 2002/0052931 A1 | 5/2002 | Peiffer et al. | |
| 2002/0144128 A1* | 10/2002 | Rahman et al. | 713/186 |
| 2002/0150041 A1* | 10/2002 | Reinshmidt et al. | 370/216 |
| 2003/0182363 A1* | 9/2003 | Clough et al. | 709/203 |
| 2003/0191799 A1* | 10/2003 | Araujo et al. | 709/203 |
| 2003/0191848 A1* | 10/2003 | Hesselink et al. | 709/229 |
| 2003/0236918 A1* | 12/2003 | Manor et al. | 709/250 |
| 2004/0039827 A1 | 2/2004 | Thomas et al. | |
| 2004/0103283 A1 | 5/2004 | Hornak | |
| 2004/0128198 A1 | 7/2004 | Register et al. | |
| 2004/0268118 A1 | 12/2004 | Bazan Bejarano | |
| 2005/0108422 A1* | 5/2005 | Krishnan | 709/233 |
| 2005/0177722 A1* | 8/2005 | Vaarala et al. | 713/168 |

\* cited by examiner

*Primary Examiner* — Barbara Burgess

(74) *Attorney, Agent, or Firm* — Banner & Witcoff, Ltd.

(57) ABSTRACT

Systems and methods for remote network access are provided. The described methods may be implemented in a computer-readable-medium and executed on a processing device. Software modules resident on one or more networks servers and one or more client computing devices cooperate to provide the client computing device(s) with remote network access.

13 Claims, 6 Drawing Sheets

SYSTEM AND METHOD FOR REMOTE NETWORK ACCESS

RELATED APPLICATIONS

This application claims the benefit of U.S. Provisional Application No. 60/433,059, filed Dec. 13, 2002, the entire disclosure of which is hereby incorporated by reference.

TECHNICAL FIELD

The described subject matter relates to electronic computing systems, and more particularly to systems and methods for remote network access.

BACKGROUND

Consumers and businesses are increasingly demanding the ability to access computer network resources from alternate locations. Usage scenarios gaining in popularity include employee access to corporate networks, supplier access to customer networks, student access to school networks, and others. These networks are referred to in this document as "target" networks.

Traditionally, this access has been provided via dial-up telephone-based connections directly between the end user and the remote network. With the ubiquity of the Internet, and given the large number of advantages of using Internet-based connections, Virtual Private Networks (VPNs) have begun to be implemented to meet these needs. VPNs make use of encryption technologies to privately and securely transport sensitive data across the public Internet.

VPNs based on World Wide Web technologies are relatively new to the market, and are rather primitive in their capabilities. Common VPN implementations enable a remote user to access, via a Web browser, a very limited subset of resources on a target network. Usually included are access to intranet documents (internal websites), access to e-mail in a restricted form, and occasionally access to files stored on network file servers.

Existing VPN implementations are subject to severe limitations in their usability. In particular, they are all restricted in the types of functionality they can provide by the intrinsic capabilities of common Web browsers and by the facilities of the Hypertext Transfer Protocol (HTTP). Only very basic file transferring, the display of websites, and the use of applications specifically designed to run within the constraints of Web technology can be achieved.

Accordingly, improved systems and methods for providing remote network access are desirable.

DETAILED DESCRIPTION

Overview

Described herein are exemplary computer-based systems and methods for providing remote network access. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

An exemplary remote network access system includes client software modules and server software modules that interact to enable the remote computer running the client software to access system resources on a network connected to a gateway system running the server software. The server software is executed on computers that are logically located inside the destination network. The client software generally runs on an end user's computer.

The server software includes a first group of components for managing the network data stream and a second group of components for managing the configuration and system state. There are two different embodiments of the client software. The first embodiment implements a VPN Client, which creates a network interface directly to the destination network, causing the end user's computer to appear as if it were physically a part of that network. The second embodiment is a browser-based method of remote access, in which all remote access is done either within or via the web browser.

One exemplary implementation includes a third software module, referred to herein as the Network Address Translation (NAT) agent, to connect remote networks to the server software. The NAT Agent may be installed on any computer at the remote network site and automatically builds a VPN tunnel to the server, thereby connecting the remote network to that server, and making it accessible to a client.

Various implementations of a remote access system involve some combination of clients, servers, and NAT agents. Servers may be placed either in a target network (e.g., in a De-Militarized Zone (DMZ) or another appropriate place) or may be connected to the target network via an IPSec connection or a NAT agent. Clients, both browser-based and VPN, then connect to the servers to the target network.

An Exemplary Computing System

Figure 1:
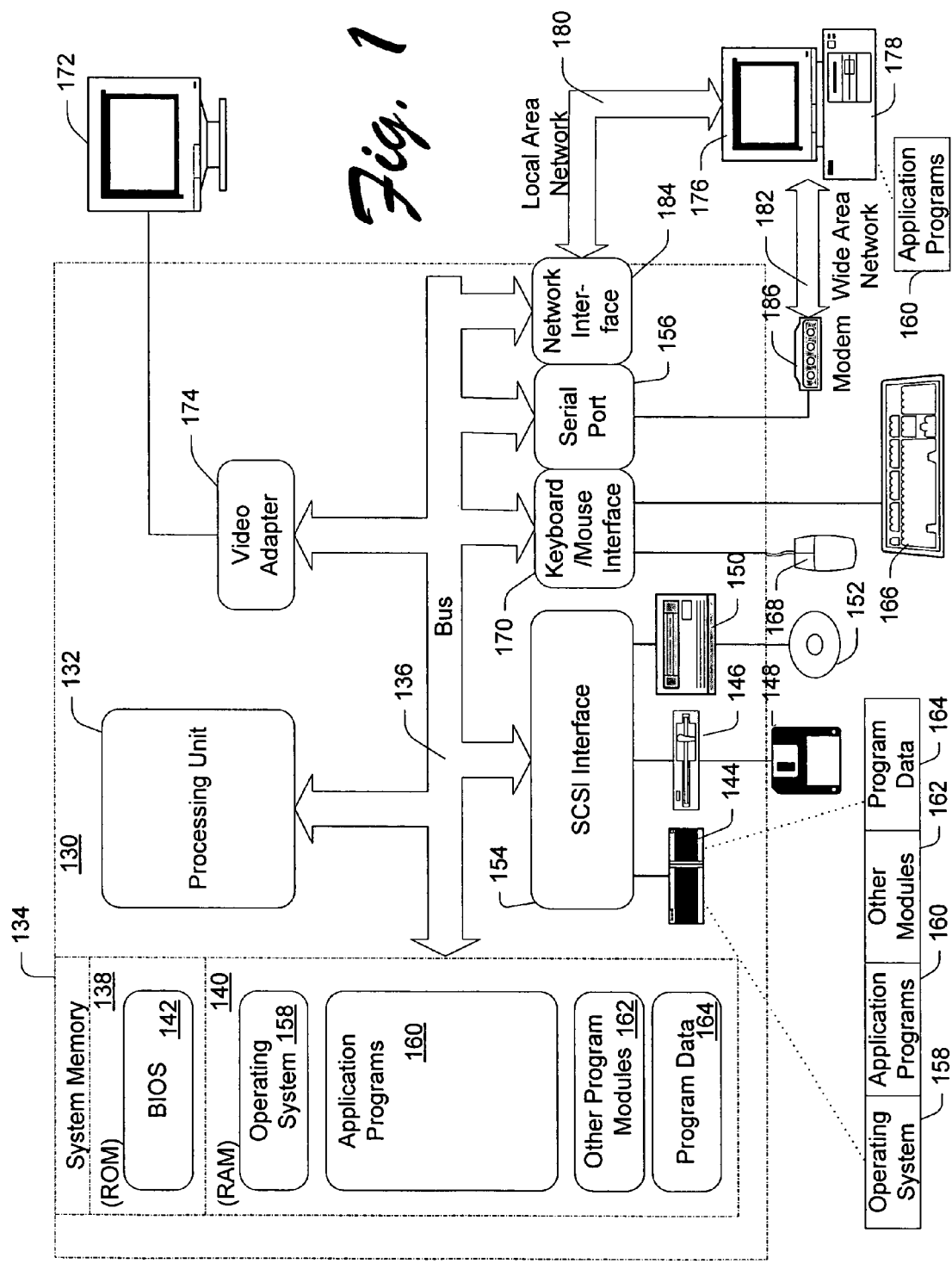
FIG. 1 is a schematic illustration of an exemplary computing device that can be utilized to implement one or more computing devices in accordance with the described embodiment.

FIG. 1 is a schematic illustration of an exemplary computing device 130 that can be utilized to implement described embodiments. Computing device 130 can be utilized to implement various implementations in accordance with described embodiments.

Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The inventions described herein includes these and other various types of computer-readable storage media when such media contain instructions or programs for implementing the steps described below in conjunction with a microprocessor or other data processor. The invention also includes the computer itself when programmed according to the methods and techniques described below.

Exemplary Network Architectures

Figure 2:
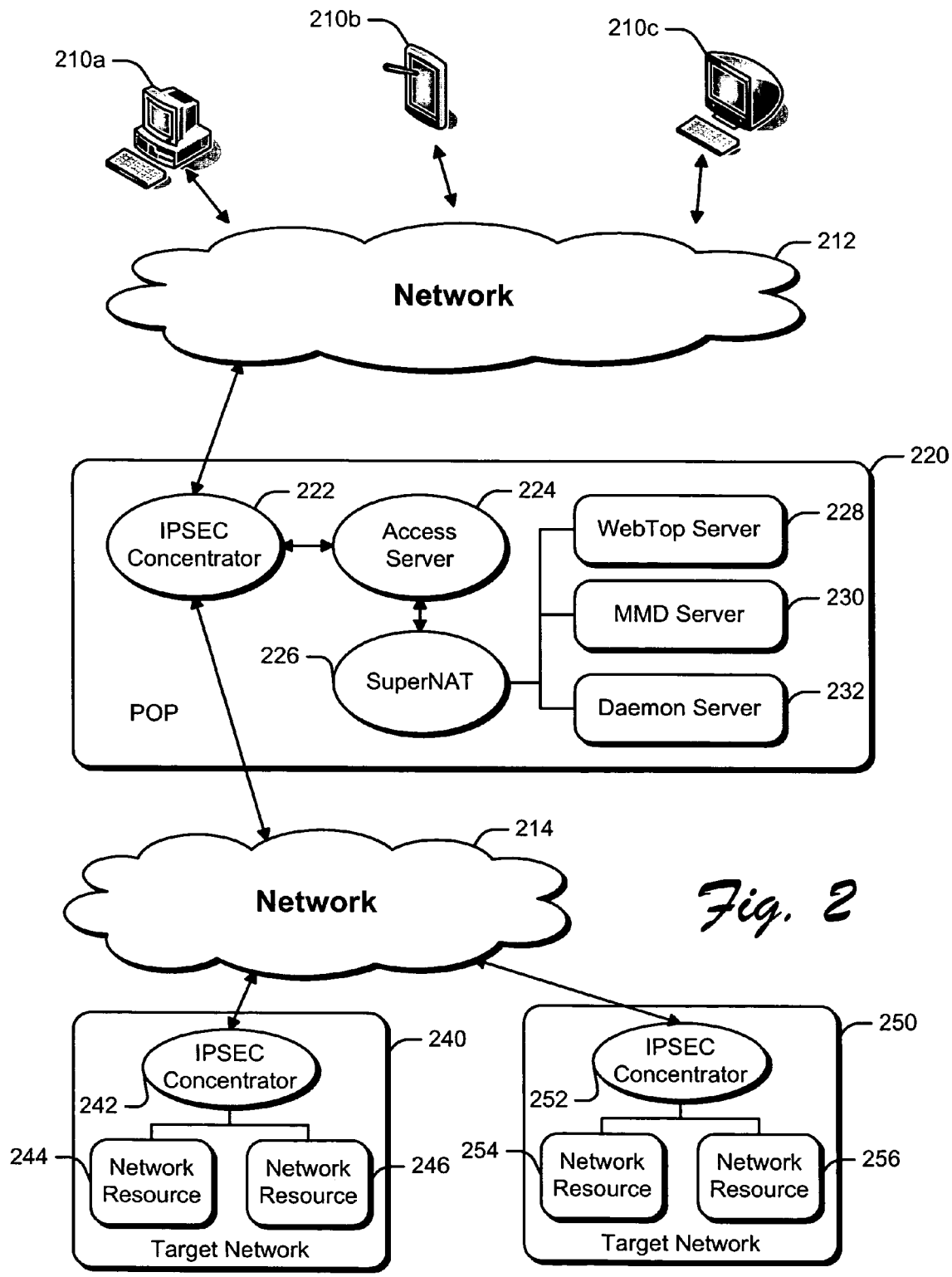
FIG. 2 is a schematic illustration of an exemplary computing network in accordance with one described embodiment.
Figure 3:
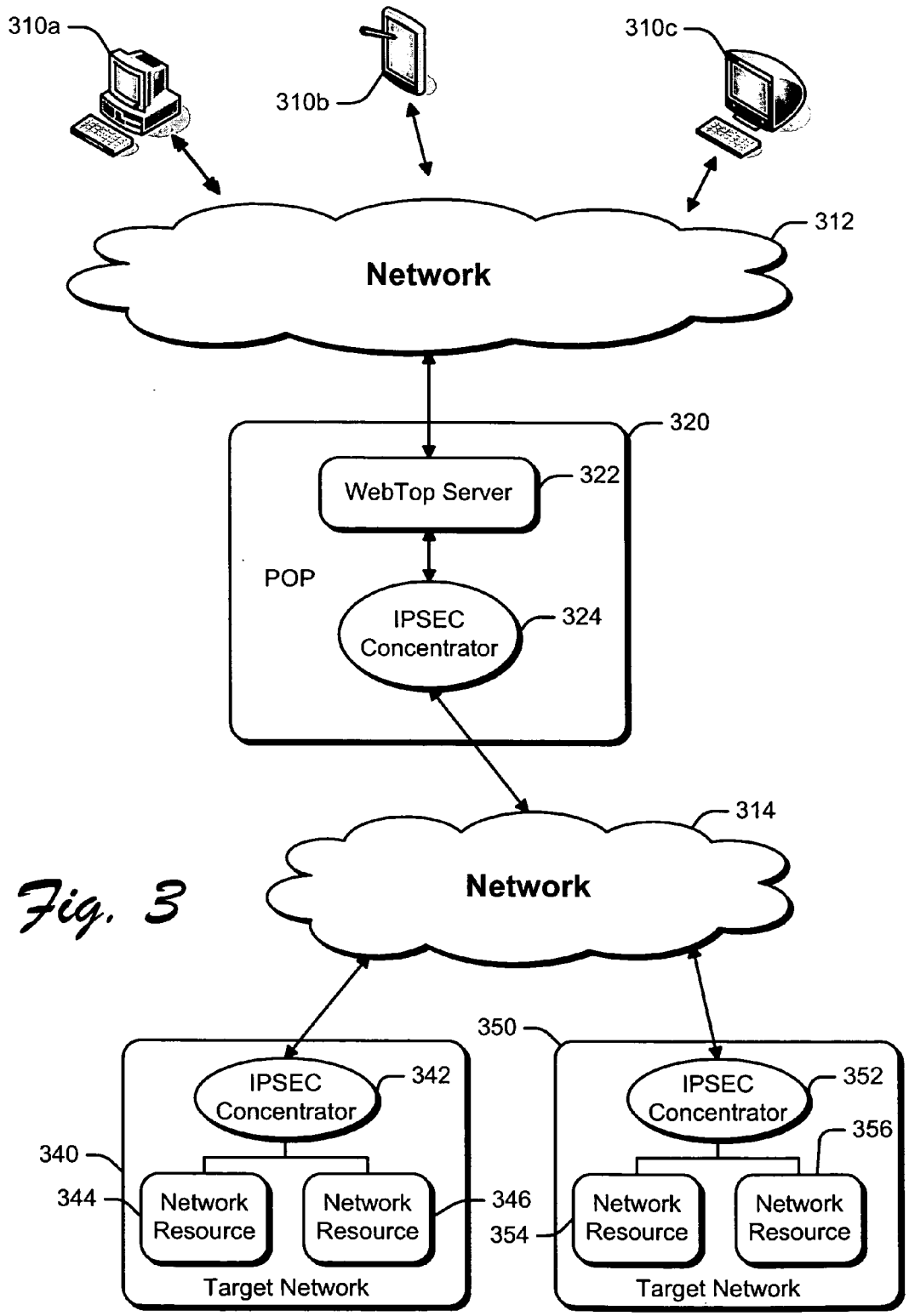
FIG. 3 is a schematic illustration of an exemplary computing network in accordance with another described embodiment.
Figure 4:
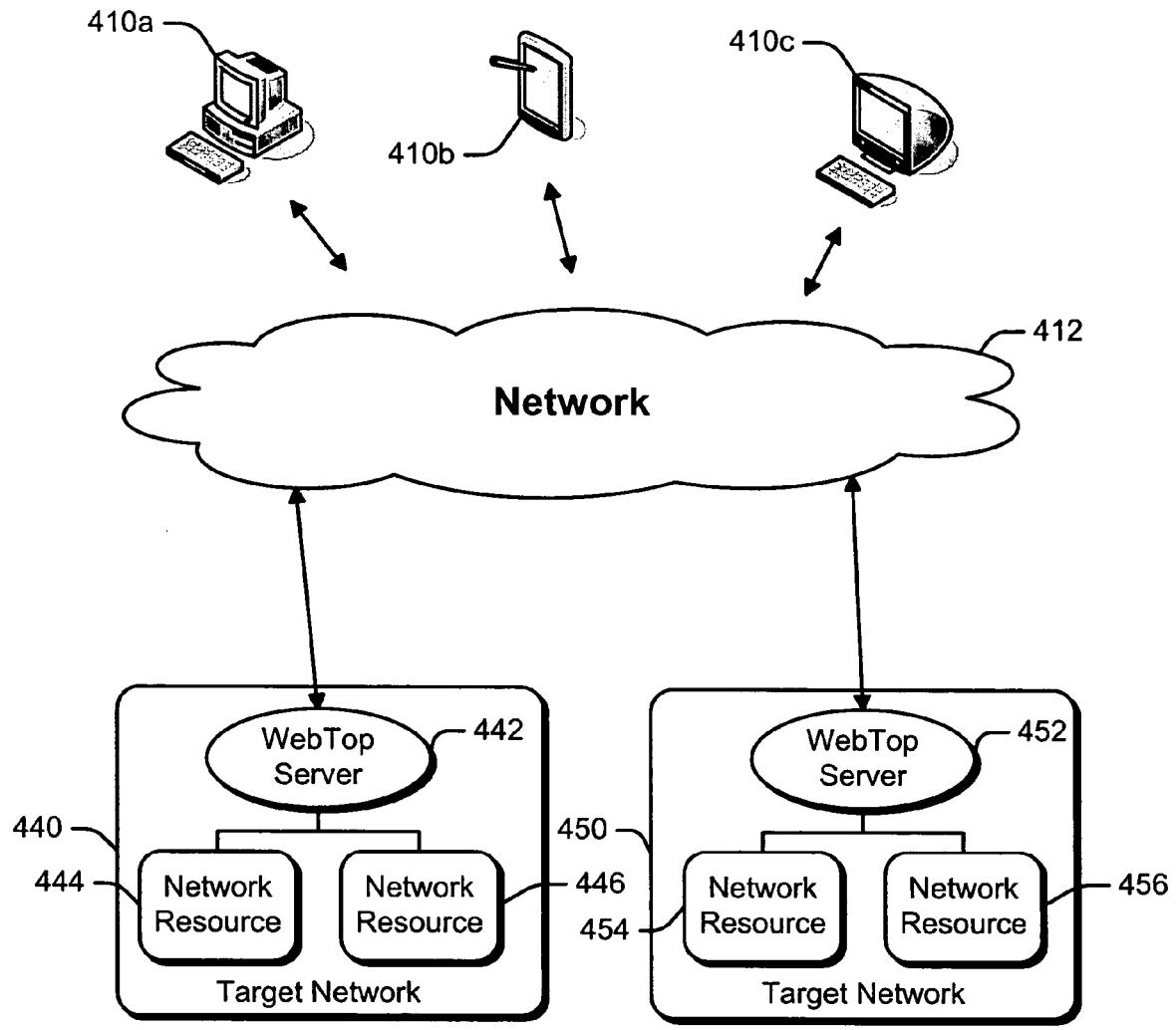
FIG. 4 is a schematic illustration of an exemplary computing network in accordance with another described embodiment.

FIGS. 2-4 are schematic diagrams of network architectures in which exemplary embodiments of systems and methods for providing remote access to one or more target networks may be implemented. Operation of various components depicted in FIGS. 2-4 will be discussed below.

In the exemplary architecture depicted in FIG. 2, one or more remote access devices 210a, 210b, 210c establish a communication connection with a Point of Presence (POP) 220, which in turn establishes a communication connection with one or more target networks 240, 250.

Remote access devices 210a, 210b, 210c may be any computer-based communication device, including a personal computer 210a, a personal digital assistant (PDA) 210b, or a terminal device 210c. Remote access devices 210a, 210b, 210c establish a communication with POP 220 via a communication network 212. The particular form of communication network 212 is not critical. Communication network may comprise one or more direct communication links (e.g., a dial-up connection) between respective remote access devices 210a, 210b, 210c. Alternatively, communication network 212 may comprise a private data network such as, e.g., an X.25 network, a local area network (LAN), a wide area network (WAN), or a public network such as, e.g., the Internet.

In the exemplary implementation depicted in FIG. 2, remote access devices 212a, 212b, 212c establish a communication connection with an Internet Protocol Security (IPsec) concentrator 222 in POP 220. POP 220 may further comprise a plurality of devices that facilitate providing a communication link with target networks 240, 250. In the exemplary implementation depicted in FIG. 2, POP 220 comprises an access server 224, a SuperNAT 226, a WebTop Server 228, an MMD server 230, and a Daemon server 232.

POP 220 establishes a communication link between the IPsec concentrator 222 and one or more target networks 240, 250, via a communication network 214. Again, the particular implementation of communication network 214 is not important. Target networks 240, 250, respectively, comprise an IPsec concentrator 242, 252, that facilitates communication connections with one or more network resources 244, 246, 254, 256, respectively.

In the exemplary architecture depicted in FIG. 3, remote access devices 310a, 310b, 310c are configured to use a conventional web browser to establish remote access to target networks 340, 350 via a POP 320. Many of the components depicted in FIG. 3 are identical to those depicted in FIG. 2. For clarity and brevity, the description of these components will not be repeated. Remote access devices 310a, 310b, 310c establish a connection with a WebTop server 322, which in turn establishes a communication connection with target networks via an IPsec concentrator 324.

In the exemplary architecture depicted in FIG. 4, remote access devices 410a, 410b, 410c establish a communication connection with remote networks 440, 450 via communication network 412. Many of the components depicted in FIG.

4 are identical to those depicted in FIG. 2. For clarity and brevity, the description of these components will not be repeated.

Exemplary Application Programs and Data

Figure 5:
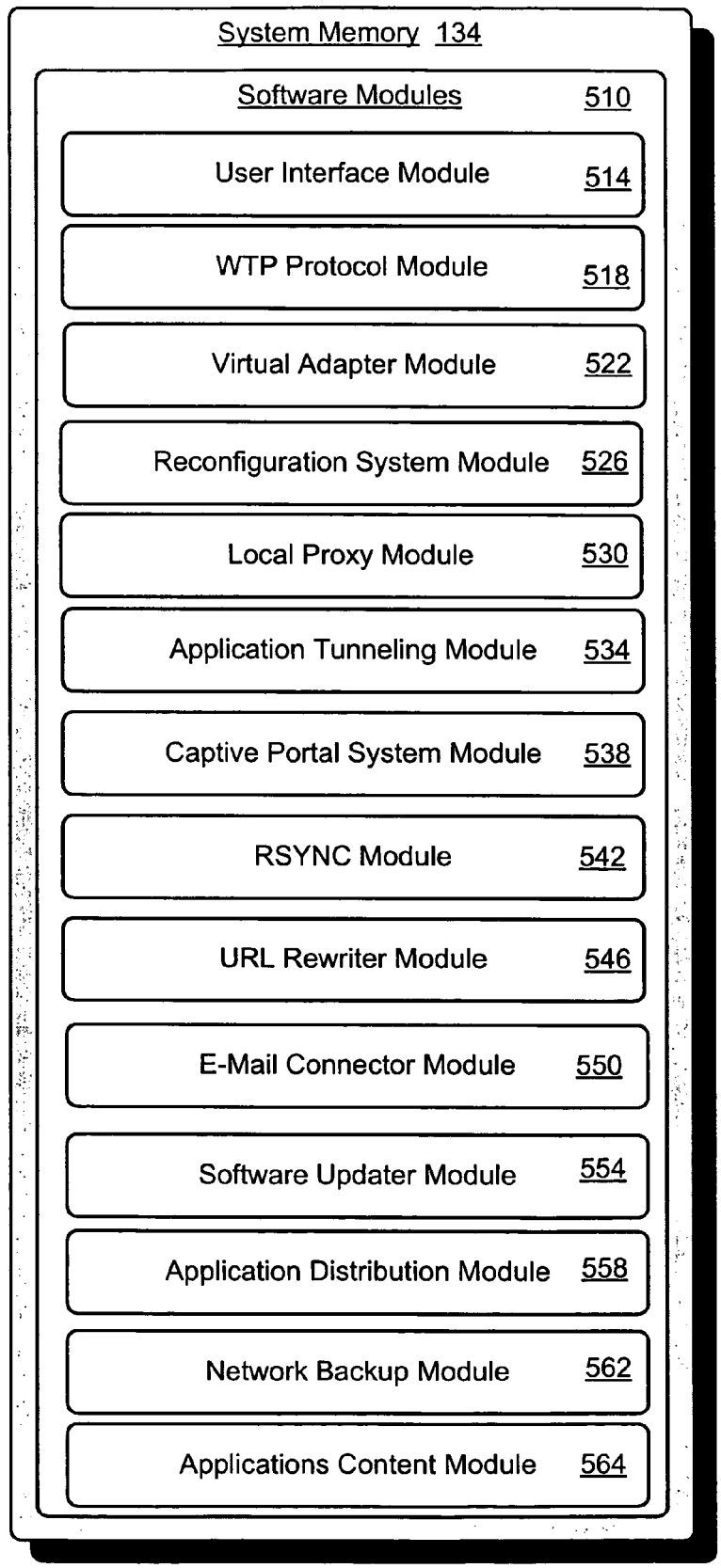
FIG. 5 is a schematic illustration of software modules resident in an exemplary client computer.

FIG. 5 is a block diagram that shows various software modules 510 resident in a computer-readable medium such as, e.g., system memory 134 of the client computer depicted in FIG. 1. In the implementation depicted in FIG. 5, the client computer may implement a browser based remote access technique, referred to herein as a WebTop, or a client-VPN access method. A client comprises a user interface module 514, a WTP Protocol module 518, a virtual adapter module 522, a reconfiguration system module 526, a local proxy module 530, an application tunneling module 534, a captive portal system module 538, an RSYNC module 542, a URL rewriter module 546, an email connector module 550, a software updater module, 554, and an application distribution module 558.

Figure 6:
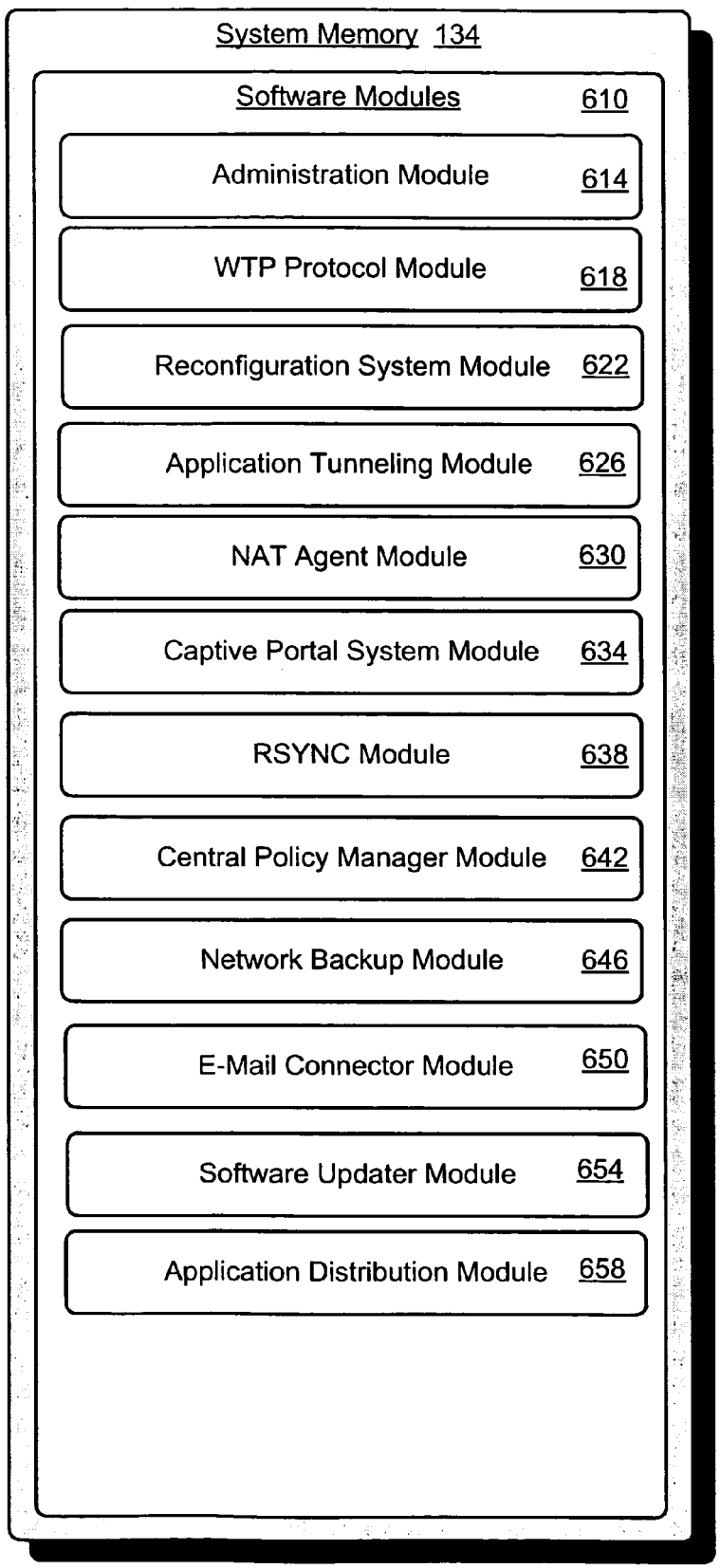
FIG. 6 is a schematic illustration of software modules resident in an exemplary network computer.

FIG. 6 is a block diagram that shows various software modules 610 resident in a computer-readable medium such as, e.g., system memory 134 of a server that interfaces with a client computer to provide a remote access to one or more target networks. A client VPN comprises an administration module 614, a WTP Protocol module 618, a reconfiguration system module 622, a an application tunneling module 626, a NAT agent module 630, a captive portal system module 634, an RSYNC module 638, a central policy manager module 642, a network backup module 646, an e-mail connector module 650, a software updater module, 654, and an application distribution module 658.

WTP Protocol

Overview

In exemplary implementations, clients and servers communicate using a secure protocol referred to herein as the WTP protocol. The WTP protocol is implemented by WTP protocol modules 518, 618, operating on the client and server, respectively. The WTP protocol provides a secure, reliable communication connection between the client and the server.

When a client connects to the server, the WTP protocol modules 518, 618 establish a WTP connection between the client (either WebTop or VPN) and the server. This connection provides a secure and reliable channel of communication between the client computer and the target network. In addition, the WTP protocol is used between servers and NAT agents.

The WTP protocol has several unique characteristics that make it suitable for a remote access application. The WTP protocol runs directly on Transmission Control Protocol (TCP) or User Datagram Protocol (UDP), making it compatible with Network Address Translation (NAT), which is a common requirement in remote access environments. The WTP protocol is capable of managing communication connections with proxy servers, including standard HTTP proxies, CONNECT-based SSL proxies, and transparent proxies. This capability enables the WTP protocol to work correctly from inside corporate networks, hotels, and other places that implement proxy server technology.

Protocol Modes

The WTP protocol provides several modes of operation (e.g., UDP vs. TCP, HTTP proxy vs. CONNECT proxy vs. transparent proxy vs. direct, with and without proxy credentials, etc.). Therefore, the WTP protocol can implement logic to determine the most efficient connection method to use. If the most efficient means of communication is unavailable, it can automatically revert to the next method, and so on. In addition, the WTP protocol incorporates compression in both the client software and the server software. Therefore, data transfer speeds can be greatly improved over traditional remote access implementations.

The WTP protocol implements a secure connection between the client and the server. It provides strong authentication of the end user via a user-configurable authentication method. For example, WTP can use SecurID, RADIUS, or normal usernames and passwords. It protects data privacy by using industry-standard Advanced Encryption Standard (AES) encryption. It prevents "man-in-the-middle" attacks using digital signature technology.

The WTP protocol has two basic modes of operation: message mode and tunnel mode. Message mode is used in a WebTop connection for all communication with the servers. When operating in message mode, WTP protocol module 518, 618 receives application-layer data and encapsulates the data directly into WTP messages. This is appropriate when data from applications is intercepted directly, before being written to the network, and without any protocol framing or headers attached.

This is always the case in WebTop connections. WebTop employs local proxies for the web browser and for any AppTunnel clients, directly capturing any application-level protocol data that they produce. This data is then directly encapsulated into WTP messages and is forwarded to the server. The server recognizes the WTP messages as message-mode by information contained in the WTP headers.

In message mode, the WTP server may function as a proxy for the client. The WTP server makes network connections to target network resources on behalf of the client. Once these connections are made, any data coming from the client is removed from the incoming WTP messages and written directly to the proxy connection.

Return data is managed in a corresponding way. Incoming data on a proxy connection is encapsulated into WTP messages. These messages are then sent directly to the client, where they are unwrapped. The message's data is then written back to the WebTop client (i.e., either the web browser or an AppTunnels client).

In tunnel mode, the WTP modules implement a communication link that behaves much like an industry-standard secure tunneling protocol such as IPSEC. Tunnel mode is responsible for the transmission of fully-formed network packets, complete with network header information and datalink protocol framing.

Tunnel mode data is captured from the virtual adapter module 522, which is described in greater detail below. When a tunnel mode packet is received from the virtual adapter module 522, the packet is directly encapsulated in a tunnel mode WTP message and transmitted to the WTP server.

The WTP server unwraps the packet, but rather than writing the data to a pre-built proxy connection, the packet is written directly to the target network. This is possible because the encapsulated packet is a fully-formed and valid network packet, complete with any addressing and network routing information necessary for the packet to get to its destination.

The target server processes the network packet as if it had been sent by a directly connected computer on the same local area network. Its reply packets are constructed in the usual way and are routed via standard packet routing mechanisms.

When the WTP server eventually receives the return packet (and the network's routing configuration dictates that it will), the packet is encapsulated directly in a WTP tunnel-mode message and sent to the appropriate client. The client then un-wraps the packet and forwards it in-tact to the virtual adapter. The virtual adapter is then responsible for handing the packet back to the user's application.

Security Features

As a secure remote access protocol, the WTP protocol modules 518, 618 ensure user and server identities through strong cryptographic authentication. The WTP modules 518, 618 encrypt all data with high-strength industry-standard cryptography algorithms, including the Advanced Encryption Standard (AES) and the Rivest-Shamir-Adleman (RSA) algorithms. Each session uses a unique encryption key, which is securely exchanged using the Diffe-Hellman (DH) key exchange algorithm. Message authentication is provided, preventing modification of messages en route, as well as preventing the injection of fake messages into the data stream.

The first step to secure remote access is set-up of a WTP session. In addition to being secure, the transactions are executed quickly and with a minimum number of steps, in order to provide high performance. In an exemplary implementation, only two messages are required to establish a WTP session.

Before initiating a connection, the WTP protocol module 518 on the client generates a DH value set. The first WTP session set-up message sent by the client to the server includes the client's public portion of the DH data. The WTP protocol module 618 on the server receives the client's DH data and generates corresponding data, the public portion of which is returned to the client in a second WTP message. This public data is encrypted with the server's private RSA key, so that it can only be decrypted by the server's corresponding public key. This provides proof of the fact that the server is genuine, and prevents a man-in-the-middle attack. The WTP protocol module 518 on the client receives this data from the server, decrypts it (thereby proving the identity of the server), and computes the encryption key. At the end of this process, the client and server have established a WTP session and now possess a shared encryption key. All future WTP transactions take place using the encrypted key.

Should re-keying be necessary (as defined by a maximum key lifetime or other policy), this can be accomplished with a re-key message of the same format as the initial message, followed by a signed response message.

During data transfer, encryption in WTP is done on a per-message basis using, e.g., the AES algorithm. However, WTP supports adding additional algorithms. Each payload is encrypted using AES-192, using the encryption key determined by the session set-up.

Prior to encryption, the payload is passed through a padding and hashing filter that ensures the payload is suitable for encryption, and provides additional obfuscation of the encrypted data.

During message transfer, each encrypted message that is received by either the client WTP protocol module 518 or the server WTP protocol module 618 is decrypted using the shared encryption key. This decryption process also serves to authenticate the message: If the message does not decrypt cleanly, it will not be forwarded on. Normal damage that can occur during network transmission will cause decryption failure, and the protocol drops any packets for which decryption fails. If decryption succeeds, therefore, it may be assumed that the received packet is authentic.

In addition, any attempt to modify a packet intentionally will result in a failed decryption and a dropped packet. Therefore, users are protected from third parties tampering with the data stream. New packets that are created by a third party must be encrypted in order for the client or server to decrypt them. However, because the third party will not have the correct encryption key (because DH was used to securely exchange the key), the attacker's packet will fail to decrypt properly and will be dropped. Therefore, it is virtually impossible to inject a rogue packet into the data stream.

Compression

To maintain adequate performance over slow communication links, the current remote access system employs compression immediately prior to encryption, while the data is still amenable to compression. The WTP protocol supports a pluggable compression architecture, similar to the encryption algorithm plug-in architecture. Exemplary implementations of WTP make use of the deflate compression algorithm.

Because compression is most useful on slow links, the WTP protocol supports enabling and disabling compression on a per-connection basis. The remote access software detects the speed of the underlying network link and enables compression only on communication links having a data transfer rate beneath a threshold. The threshold may be fixed or may be adjusted dynamically as a function of network traffic conditions.

Connection Modes

One requirement of a remote access protocol is compatibility with whatever network the remote user happens to be connected to at the time. To provide compatibility with all sorts of network settings, the WTP protocol supports four different connection modes. Each connection mode offers the same high level of security, but they differ in their network compatibility and performance.

In networks that support it, the most efficient and simplest protocol mode is the Direct Connection mode. In this mode, WTP messages are written directly to a TCP or UDP socket connected between client and server. There is no additional protocol overhead to reduce data transfer performance. TCP is used on unreliable connections and on connections with which UDP connections fail, such as in networks with a low maximum transmission unit (MTU).

Because WTP protocol packets can be encapsulated directly into TCP packets or UDP datagrams, the WTP protocol is natively compatible with any standard network address translation device. The WTP protocol enhances this compatibility by not placing any lower-level network routing information in any high-level data structures. Therefore, this mode of communication will be used most commonly in home environments and corporate environments that do not require the use of a proxy server. To further enable the latter case, the protocol operates using the same TCP ports that standard web traffic uses. Many firewalls permit this sort of traffic in and out of the network.

For networks that require the user of a proxy server, the second most efficient method is a direct connection through that proxy server to the WTP server. This is possible because most proxy servers allow the use of a proxy method known as CONNECT, to facilitate the use of SSL. These servers generally also allow for the use of WTP, as it operates in a similar way to native SSL. Because the proxy server knits together an internal WTP connection with an external connection, its performance is also generally good.

Some networks prevent standard SSL use altogether, preferring to proxy such data in standard proxy servers. Other networks make use of transparent proxy servers, which tend to intercept direct SSL connections. In these networks, the WTP protocol supports an HTTP encapsulation mode. WTP messages are embedded in standard HTTP POST messages and are transmitted over the standard HTTP port. Receive traffic comes in as responses to the HTTP post requests. Because these messages are fully valid HTTP messages, they can be correctly proxied by transparent proxies and by standard http proxy servers.

Finally, if the network requires direct (as opposed to transparent) use of the proxy servers, the WTP protocol supports directly posting the HTTP messages to a specified proxy server on a specified port, for both send and receive traffic. This method is the last line of defense, and is works in any situation in which a web browser on the computer also works.

Fail-Over Process

The process of determining which of the connections to use is complicated by a number of factors. The protocol supports changing of location, so each location's required access method is cached in the client computer's permanent storage. Each successively more compatible mode carries with it a certain performance penalty, so it is important to make the correct decision about which method to use the first time.

The decision process can take a long time, so the protocol caches the decision it makes for quick referral on future connections. Network locations are identified with a heuristic process, and each location has a setting for which connection method to use. To identify a location, the WTP protocol takes into account the identity of the network adapter, which owns the default IP route, the client's current DNS search domain, and the subnet which the client's primary IP address falls into. Each parameter is weighted and a decision as to whether or not the client's location has changed is made.

If the client is found to be at a pre-existing network location, that location's settings are used. If a connection cannot be made with those settings, or if a location does not exist that corresponds to the network the client is on at the time, a decision process is undertaken. First direct TCP and UDP are tried on ports 80 and 443. If no direct connection is possible, the client attempts connection via HTTP POST mode on port 80. If this fails, the user's proxy server settings are harvested from the primary web browser on the system, and a proxy connection is attempted with HTTP POST. If that fails, or if the user does not have proxy settings, the client prompts for connection information (selection of mode, server addresses and ports, etc). This process repeats until the user cancels.

WTP Messages

As a protocol, WTP is inspired by Hypertext Transfer Protocol (HTTP) as documented in Request For Comments 2616, published by the Internet Engineering Task Force. WTP also closely interacts with HTTP clients, servers, and proxies. Its message format is directly derived from HTTP and is in fact valid HTTP 1.0. As such, the HTTP specification is hereby incorporated by reference. WTP message characteristics include:

The request type is always POST

The full-request is always:

POST http://wtp.webtop.positivenetworks.net HTTP/1.0\r\n

The Host: header is always set as follows:

Host: <wtp server name>\r\n

The HTTP Content-Length: header is always set to the length of the message, as specified by the HTTP standard The HTTP Connection: header may be set as follows by the server side:

Connection: close

The HTTP Server: header may be set as follows by the server side:

Server: <wtp server name>

The HTTP Proxy-authentication: header may be set if needed

Note that not all HTTP headers required by the HTTP/1.1 specification are necessarily set by WTP. The intention of WTP is not to be strictly conformant to HTTP/1.1; the intent is to be treated correctly by intermediate HTTP proxy servers.

In addition to the above-mentioned standard HTTP headers, all WTP Messages include all of the following custom headers:

Webtop-Type: may be set to:
0 for request messages
1 for response messages
2 for exception messages Webtop-Method: May be set to:
0 for GET_URL: The client is requesting that the server retrieve a URL for it
1 for KEY_EXCHANGE: The client is requesting that the server negotiate an encryption key
2 for AUTHENTICATE: The client is requesting authentication for its session
3 for SHUTDOWN: The client is requesting a logoff and disconnect
4 for TCPTUNNEL_START: Attempts to start a TCP tunnel
5 for TCPTUNNEL_DATA: Communicates TCP tunnel data such as SSL. The WebTop-TcpTunnelId attribute must be valid
6 for TCPTUNNEL_STOP: Attempts to close a previously opened TCP tunnel
7 for RECV: Used to receive arbitrary data from the server.
8 for TEST: Ping-like method for use by the client to test reachability of the server
9 for TIMEOUT: Sent to notify of a session timeout
10 for GETCONFIG: A request for configuration, such as proxy-for-uri configuration Webtop-SessionId: Set to the assigned Session ID for the WTP session Webtop-MessageId: Set to the Message ID. Each message gets a globally-unique message ID.

Webtop-Version: Set to the version of the WTP Protocol, currently 1.0.0

Webtop-TcpTunnelId: OPTIONAL, set to the TCP tunnel ID if applicable.

WTP Payloads vary by message type. They are:

GET_URL: The encrypted HTTP request

KEY_EXCHANGE: The public Diffie-Hellman keying material of the sender

AUTHENTICATE: An XML document as follows:

```
<Authentication>
    <WebSessionId>$$WEB_SESSION_ID$$</WebSessionId>
<WebSessionHash>$$WEB_SESSION_HASH$$</WebSessionHash>
    </Authencation>
```

SHUTDOWN: The payload is empty.

TCPTUNNEL_START: A request as follows:

CONNECT <host>:<port> HTTP/1.0

TCPTUNNEL_DATA: Raw data.

TCPTUNNEL_STOP: Payload as follows:

FILLER

RECV: Payload as follows:

FILLER

TEST: Payload as follows:

Ping

TIMEOUT: Payload as follows:

FILLER

GETCONFIG: an XML document specifying the configuration of the WTP client

WTP Features and Requirements

Apart from generic data transport, the WTP protocol has many requirements that the HTTP protocol does not address. The design of WTP is driven by additional requirements.

Features of WTP include the following:

User Authentication

The WTP protocol requires authentication of the user, unlike HTTP, which merely allows for authentication. As such, a specific WTP authentication message is specified.

Authentication is based on a session ID and a session hash. These values are created and maintained by WebTop during the course of operations. They are based on the same session that the user establishes while logging into WebTop via the web browser. The expiration of the session terminates the WTP connection.

Server Authentication

Authentication of the WTP server is also required. This prevents an attack known in data security circles as the "Man In The Middle" attack (details available in an appendix to this document). The user must know with certainty that the party at the other end of the connection is the correct server.

This is accomplished with public key cryptography techniques. The algorithm used is the RSA, the most widely-used public key cryptosystem in existence. The server is assigned a private key, only known to that server, and the AppTunnels client is programmed with the corresponding public key. During WTP session setup, the private key of the server is validated against the public key in the AppTunnels Client, proving the identity of the server.

Data Security

Data Security is a consideration in WTP. Security implies privacy of the data in this case. To ensure privacy, encryption is used. The AES algorithm, the new US Government encryption standard, is employed to encrypt all transactions between the WTP client and server.

In order to agree on a secret key with which to do the encryption and decryption, a cryptographic key exchange algorithm known as Diffie-Hellman is used. With this algorithm, a third party witnessing the transactions is unable to deduce the agreed-upon secret key. For details, see the cryptography appendix to this document.

Out of Band Signaling

Once a session is established, the WTP client and server must be able to signal each other about important events (session teardown, timeouts, etc.). This is accomplished by specific out-of-band message types defined for this purpose.

Generic Data Transport Capability

The ability to carry generic data is key to WTP. It inherits this ability directly from HTTP. However, unlike standard implementations of HTTP, WTP is explicitly intended to carry network-layer data for the purpose of application tunneling.

Multiple Connection Modes

In order to maximize both connection speed and compatibility with deployed networks, three connection modes are specified as a part of WTP, rather than the one for HTTP. These are:

Direct TCP for speed and simplicity—This method results in the fastest client-server connections and consequently in the highest performance for AppTunnels applications. However, it is easily broken by intermediate devices such as Proxy Servers and Firewalls.

HTTP/1.1—This method works around many of the most common blocks for Direct TCP. It also results in relatively fast client-server connections, since it makes use of HTTP1.1 features such as pipelining, if intermediate Proxy servers support them.

HTTP/1.0—This is the fallback method for older Proxy servers and firewalls. It will traverse any HTTP1.0-compliant proxy server. However, because it is exclusively based on polling, it is the slowest of the three access methods.

Statelessness

Statelessness at the protocol level is required since two of the three modes are transaction-based. As such, all state must be maintained in the extended WebTop headers (described above) and by the connection endpoints. Webtop-Session is the primary state maintenance header in WTP messages.

WTP Protocol Operations

WTP connections are always initiated by the AppTunnels Client. An exemplary session proceeds as follows:

1. The WTP client sends a REQUEST (type 0) message to the WTP server of type KEY_EXCHANGE. It includes its half of the Diffie-Hellman negotiation.

2. The WTP server sends a RESPONSE (type 1) message to the client of type KEY_EXCHANGE, including its half of the Diffie-Hellman negotiation. This keying material is encrypted with the server's private key for server authentication purposes.

3. The WTP client sends a REQUEST/AUTHENTICATE message to the server with its SessionId and SessionHash specified as defined in the message definition above.

4. The WTP server sends RESPONSE/AUTHENTICATE to the client. In the event of a failed authentication, the server makes no reply.

5. The WTP client sends REQUEST/GETCONFIG to the server

6. The WTP server sends RESPONSE/GETCONFIG with the configuration message as defined above.

7. The WTP client may make one or more GET_URL requests, with responses returned as data is retrieved by the WTP server 8. The WTP client may make one or more TCPTUNNEL_START requests, in order to start a TCP tunnel.

9. The WTP server responds with the following if the setup is successful:
   HTTP/1.0 200 Connection Established\r\n\r\n
   WTP server responds with the following if the setup fails:
   HTTP/1.0 503 Service Unavailable\r\n
   Connection: close\r\n\r\n

```
<HTML>
    <BODY>
        The service you requested is unavailable.
    </BODY>
</HTML>
```

10. The WTP client may make one or more TCPTUNNEL_DATA requests in order to send data to the server.

11. The WTP server sends back a response as follows:
NA

12. The WTP client may make one or more RECV requests

13. The WTP server will block indefinitely until there is data to be returned. When there is, that data is returned in raw form in the payload.

14. The WTP client may make one or more TCPTUNNEL_STOP requests in order to terminate a give tunnel.

15. The WTP server responds with the following:
FILLER

16. The WTP client sends a SHUTDOWN message to the server

17. There is no response to this message.

Note that there are additional possibilities for conversations not explicitly outlined here. A valid WTP conversation is any conversation that conforms to the WTP protocol standard as just described.

WTP Connection and Configuration Processing

Next, the Client makes a WTP connection to WebTop. It follows the session setup procedure outlined in the WTP description section. It authenticates the server, exchanges keys, authenticates the session, and requests its configuration.

It receives its configuration from the GETCONFIG request, and it looks at that configuration to determine what AppTunnels to set up. It then binds itself to the local ports specified by the configuration response. The example implementation only implements support for forwarding of TCP data, but the WebTop specification includes design for forwarding of any user-mode network traffic, including in particular UDP.

Once bound to the local ports, the Client diverts network traffic to the configured target network servers to the local computer, so that the Client itself will receive the traffic. This diversion is accomplished by reconfiguration of the computer's DNS resolution system, usually by reconfiguration of a local 'hosts' file.

Virtual Ethernet Adapter Module

The VPN client allows users to remotely access computer networks and the resources they contain by means of a secure, encrypted tunnel across the public Internet. In an exemplary embodiment the VPN client implements a virtual adapter module 522 that functions logically as a network adapter in the user's computer. Network adapter module 522 is a software-instantiated logical device that connects the computer to one end of this encrypted tunnel.

The virtual adapter module 522 instantiates itself on a VPN client and directly emulates an Ethernet adapter. Therefore, the virtual adapter module 522 is immediately compatible with any software application that interfaces with Ethernet adapters. Additionally, the virtual adapter module 522 permits a direct and open line of communication between the remote access software and the virtual adapter itself.

When installed on a computer system, the virtual adapter module 522 presents itself to the operating system as an Ethernet adapter. It emulates the normal actions and responses of a physical Ethernet adapter, without the aid of any extra hardware. The virtual adapter module 522 can be directed to connect and disconnect from the network and to send and receive packets. Sent packets are captured by the virtual adapter module 522 as a natural result of the operating system's architecture and mechanisms. Received packets are presented to the virtual adapter module 522 by the remote access software. In all other respects, the system cannot tell the difference between the Virtual Adapter software and any other Ethernet adapter.

Virtual Adapter Architecture

In an exemplary embodiment, the virtual adapter module 522 may be implemented as a standard NDIS deserialized miniport driver, conforming to the ARPA (DIX) Ethernet standard. The virtual adapter module 522 may be divided internally into several logical components. A first software module that implements the "send path" is responsible for receiving user packets and forwarding them into the VPN. A second software module that implements the "receive path" performs the reverse process. There are also additional software modules that perform ancillary functions used for configuration, connection, disconnection, DHCP, ARP, and status queries and sets.

The software module that implements the send path captures packets from the operating system, e.g., via standard NDIS callbacks MiniportSend and MiniportSendPacket. These packets arrive in the driver because they were submitted to the operating system with a destination IP address that matched the virtual adapter module 522 as the path to the next hop. MiniportSend receives a single packet at a time. The virtual adapter module 522 takes that packet from NDIS and queues it on the internal Send Queue, which is implemented as a standard queue data structure, and its access is synchronized via a spin lock. The software module that implements the send path then calls MiniportSendPacket is one or more outgoing packets, each packaged an NDIS_PACKET data structure. The SendPacket handler unwraps each packet and queues it on the same send queue. Upon queuing all presented packets, the send handler is done and returns control to the operating system. In an exemplary implementation the send path is implemented as a polled architecture; however, this functionality may also be implemented platforms as a direct call-out.

The software module that implements the send path is invoked when the remote access software calls a function in the virtual adapter module 522 to retrieve any queued packets. The virtual adapter module 522 places any packets on its queue into a return buffer specified by the calling module. If no packets are available to send back, then the call is blocked in the virtual adapter module 522 until the first packet becomes available. Once all available packets have been copied to the calling module, the virtual adapter module 522 returns control to the calling module, which then packages the packets into VPN messages and transmits the packets.

The software module that implements the receive path is invoked by remote access software calling into the virtual adapter module 522 with one or more received packets. These packets have been removed from the VPN tunnel, decrypted, un-wrapped, and prepared for transmission back up through the communication protocol stack to the end user.

The receive path software module copies all indicated packets into its own locked buffers (as required by NDIS), and re-writes the source and destination Ethernet addresses to match the Ethernet address of the virtual adapter module 522 and of the Virtual Gateway. These addresses enable NDIS to properly receive and route packets destined for the virtual adapter module 522. The virtual adapter module 522 then queues the packet on the receive queue. Once all received packets have been queued into the receive queue, the virtual adapter module 522 schedules a receive event with NDIS.

When the receive event is signaled, the receive indicator function of the virtual adapter module 522 is called back. The receive indicator de-queues the packets in the receive queue and submits them, to NDIS. The operating system receives the packets and routes them to the correct end-user applications.

In addition to the core send and receive path functionality, the virtual adapter module 522 also manages a set of ancillary functions that allow configuration and control of the virtual adapter module 522. In an exemplary implementation the principle interface for this configuration and control is via the standard Device I/O Control (IOCTL) interface that is common to all Windows device drivers. This interface is a function-based method that system components use to communicate with one another. The virtual adapter defines a number of function codes that are used by the remote access software:

- IOCTL_POSVPN_SEND is used to retrieve packets from the send path queue, as described above
- IOCTL_POSVPN_RECV is used to indicate received packets to the driver for submission to the operating system
- IOCTL_POSVPN_CONFIG (along with other related control codes) is used to configure the virtual adapter with its operating parameters The IOCTL interface is an extensible interface that can directly accommodate most architectural changes to the remote access software.

To route packets correctly, the virtual adapter module 522 also provides a proxy ARP implementation to answer ARP requests from the operating system. As such, the virtual adapter module 522 implements a full RFC-compliant ARP responder that answers ARP requests. Because the virtual adapter module 522 is the next hop for any address pointed to it by the routing table, the ARP responder answers with the Virtual Gateway address for any request. During send processing, the virtual adapter module 522 separates ARP requests from other packets. The virtual adapter module 522 then invokes the internal ARP responder for each ARP request.

During start-up of the virtual adapter module 522, the operating system must be informed of the Internet Protocol (IP) address that is to be assigned to the virtual adapter module 522. In addition, the virtual adapter module 522 may change its IP address during every sign-on and sign-off. To make this possible, the virtual adapter implements a Dynamic Host Configuration Protocol (DHCP) server. During boot-up, the operating system sends DHCP requests out on the virtual adapter module 522. Instead of queuing these requests to the normal send path queue, the virtual adapter module 522 software recognizes them and responds directly with the default adapter IP address.

During system sign-on, the virtual adapter module 522 is configured (e.g., via the IOCTL interface) with the assigned IP address. The remote access software then signals the operating system to "renew" the IP address on the virtual adapter module 522, causing another round of DHCP queries. These queries result in the newly-assigned IP address being returned and the addressing information on the adapter being reconfigured. In addition, the address, other IP-specific parameters are returned and configured, including the subnet mask, the default gateway, the Domain Name System (DNS) servers, the default search domain, and the Windows Internet Name Service (WINS) servers. System sign-off results in the remote access software causing another renew of the adapter's configuration, which returns the default configuration data.

The virtual adapter module 522 may be implemented as an NDIS-compliant Ethernet miniport. An installation information (INF) file is provided with the virtual adapter module 522, and the remote access software signals the installation of the adapter via that INF file during system installation.

Reconfiguration System Module

Overview

As users use their computers in more varied ways, it is necessary for the configurations of applications and of the computer itself to be changed to fit the usage situation. Telecommuters might log into applications remotely, requiring different application settings than at the office. Laptop users may plug into a foreign network and have to adjust their proxy server settings in their web browser. Home users may need to change the configuration of their computers in order to work from home. Furthermore, many of these changes are only appropriate for a limited period of time, e.g., during telecommuting, or during the time that the computer is plugged into the foreign network.

The reconfiguration system modules 526, 622 accommodate these needs by automating reconfiguration tasks, thereby obviating the need for end users to know technical configuration details about applications or computers. Most of the reconfiguration functionality takes place in the reconfiguration system module 526 on the client computer. The reconfiguration process has four characteristics.

First, the reconfiguration process can execute "on-the-fly", i.e., without the need for re-starting the computer or (in most cases) even re-starting the configured application or system.

Second, the configuration changes made by the reconfiguration system are fully reversible. When an event occurs that requires reconfiguration of a client computer (i.e., when a user accesses a target network) the client computer is automatically reconfigured to accommodate the required settings. When the need for the reconfiguration has passed (i.e., when the user exits a target network, or quits working for the night, etc.), the reconfiguration module 526 automatically rolls back any changes made to the computer's configuration.

Third, the reconfiguration process is temporary. The reconfiguration system module 526 tracks original configuration values via a configuration cache file that is used to subsequently undo any changes that are made as a part of the reconfiguration process.

Fourth, the reconfiguration process is fully fault-tolerant, and reacts well to a number of exception conditions. All configuration changes are logged to a local configuration cache file prior to being implemented on the computer. A number of failsafe measures are taken to ensure that the rollback information is safely captured before any configuration changes are made. In the even of a sudden disconnection from the network, reboot, system crash, etc., the software reacts appropriately and un-does any configuration changes it made during the reconfiguration process.

DESCRIPTION

The reconfiguration system modules 526, 622 are software applications that, when execute on a computer processor, that makes reversible changes to the configuration of that computer. The system can operate on any operating system and computer. One exemplary implementation of the system is based on Microsoft WINDOWS™ operating systems.

To begin the reconfiguration process, the reconfiguration system module 526 executing on the client computer develops a list of configuration settings that are to be changed. The list may be implemented as a structured XML document that the reconfiguration system module 526 parses. This information in the list becomes the list of settings that will be changed during the reconfiguration process, it supplies the new configuration values, and it serves as a list of settings to pre-cache so that any configuration changes can be un-done.

The initial phase of the reconfiguration process involves collecting current configuration data for any configuration settings that will be changed. The reconfiguration system module 526 launches queries to the client computer's operating system to obtain initial configuration settings. The results of these queries are stored in a local configuration cache file.

Data written to the configuration cache file is flushed to a physical disk to prevent loss in the event of a sudden loss of power or a system crash. The configuration cache file is placed in a well-known location on one of the client computer's hard disks. The location of the configuration cache file is also noted in in a configuration file, or in the registry in a WINDOWS operating system. This aids the reconfiguration system module 526 in locating the configuration cache file in the event that an emergency rollback becomes necessary.

The reconfiguration system module 526 is then configured to start automatically on the next boot of the system. Accordingly, if power is lost or if the system crashes, the reconfiguration system module 526 will run automatically on the next startup of the system. This effectively implements an emergency recovery process, whereby the software loads the configuration cache from the previously-specified location on disk and systematically rolls back all configuration changes.

The reconfiguration system module 526 also implements configuration changes. The reconfiguration system includes a plurality of modules that implement a particular class of setting change.

In one implementation, the reconfiguration system module 526 invokes the registry reconfiguration component of the Microsoft WINDOWS operating system. In particular the reconfiguration system module 526 invokes the following application programming interfaces (APIs) to query and set registry values:

RegCreateKeyEx( )—Using this API, the software is able to open or create any registry key on the system RegDeleteKey( )—Using this API, the software is able to delete any registry key on the system RegDeleteValue( )—Using this API, the software is able to delete any individual registry value RegQueryValueEx( )—Using this API, the software is able to return the current setting of any registry value RegSetValueEx( )—Using this API, the system is able to create and set new registry values These APIs are called as dictated by the reconfiguration data collected by the reconfiguration system module 526. Using these functions, the reconfiguration system module 526 has total control over the computer's registry on which it is executing.

In addition to the registry-based techniques described above, the reconfiguration system module 526 includes a file reconfiguration module that can independently manipulate files on the local computer's file systems. The file reconfiguration module operates with most operating systems.

The file reconfiguration module is written using the standard "C" library. In particular, the file reconfiguration module supports the following operations:

File creation—the module is able to create a file anywhere on the user's computer, with arbitrary contents.

File deletion—the module is also able to delete any file on the user's computer.

File modification—the module is able to modify the data contained in a file as needed.

File metadata manipulation—the module is able to read and update the metadata of any file on the system. Metadata includes creation time, creation date, owner, access permissions, and other data.

The file reconfiguration module is able to make configuration changes that are based on the existence or contents of files on the system's disks. Examples of files that could be updated include configuration files, initialization (.ini) files, and system data files (password databases, etc).

In addition, the reconfiguration system module 526 is able to handle various high-level reconfiguration tasks. Because the reconfiguration system module 526 executes on the client computer's operating system, it has direct access to any configuration-related interface defined by that operating system. Examples of high-level reconfiguration activities managed by the reconfiguration system module 526 include:

The reconfiguration system module 526 uses a multi-step process to reconfigure the background that is displayed on the user's screen The reconfiguration system module 526 is able to parse and intelligently update certain configuration files (.ini files in particular), on a setting-by-setting basis, as opposed to having to replace the entire file with a reconfigured copy.

Certain low-level network configuration settings are adjusted by using the standard IPHLPAPI library, present on Windows systems The reconfiguration process begins when the reconfiguration software is started and given a reconfiguration script to follow. The reconfiguration system module 526 first parses the reconfiguration script and builds an internal list of reconfiguration actions. The reconfiguration system module 526 then follows this list, collecting original values for each setting to be reconfigured. The list of reconfigured settings is stored in a local configuration cache and flushed to disk. Next, the reconfiguration system traverses the list of reconfiguration items, implementing changes to the settings as indicated in the list. Registry settings are updated, followed by file settings, followed finally by high-level reconfiguration changes.

Some time later, the reconfiguration system module 526 may be invoked to undo any configuration changes that have been made. In this event, the reconfiguration system module 526 determines the location of the configuration cache file. This file is placed in a known location and is referenced in the computer's registry or in other well-known configuration files.

The reconfiguration system module 526 traverses the list of items in the configuration cache file, restoring each item to its original state. In an exemplary implementation, configuration changes are implemented in the opposite order than changes implemented during the initial reconfiguration process. Once the software completes its pass through the cache file, it deletes the cache file and removes itself from the automatic start-up of the system.

Note that if the configuration process is interrupted, it will be automatically be re-started at the next boot. The system waits until a successful reconfiguration is confirmed before removing the configuration cache and removing the auto-start of the software from the system.

Certain configuration changes are more complicated than simple changes to files or registry values. These are known as multi-step reconfiguration items. The structure of the instructions presented to the software accommodates multi-step processes. An example of a multi-step reconfiguration process is in the reconfiguration of the background image ("wallpaper") on Windows computers. First a file with the new background must be created on the computer. Then a number of registry keys must be set. Finally, a configuration update API function must be called to alert the operating system of the change.

In addition, the system allows for the specification of "atomic" change sets. For example, if a particular configuration change requires setting of three registry keys, but only two are able to be successfully set, the reconfiguration system module 526 will undo changes made to these two registry values if the third reconfiguration cannot be confirmed.

Users do not always have sufficient rights to make particular configuration changes. To resolve this issue, the reconfiguration system module 526 invokes an administrative service for making some configuration changes. This administrative service runs as a part of the operating system, in a privileged mode. It is therefore able to make any change to the computer's settings. The administrative service provides a private, authenticated interface to the rest of the reconfiguration system module 526.

If the reconfiguration system module 526 is unable to make a configuration change, the reconfiguration system module 526 sends that change to the administrative service for processing. The administrative service authenticates the request (as a security measure), and then proceeds to make the change on behalf of the requesting process.

On Windows platforms, the administrative service is a standard Windows Service program. It is installed into the Service Control Manager. It accepts connections from the reconfiguration system module 526 via a mechanism known as "named pipes".

The administrative service listens for client connections to the named pipe. When a connection is made, the service accepts the connection and listens for a reconfiguration request from the client. The client sends a message to the server to indicate the sort of reconfiguration task that the service is to perform on behalf of the client. The service then authenticates the request on a type-by-type basis, and if the request is found to be valid, performs the requested setting change. Finally, a result value indicating failure or success of the operation is returned to the caller. This process is repeated for each configuration item that the reconfiguration process is unable to complete on its own.

The administrative service also supports querying of a setting prior to changing. This capability is used by the reconfiguration system module 526 to build the initial configuration cache that is used during the rollback process. In the case of a settings query, the software supplies a data buffer into which the service writes the results of the query for the software.

The reconfiguration and rollback process is organized to occur in the context of a "configuration profile". Each profile contains a list of the settings that are to be changed, including the values to which each setting should be set. The user (or program) simply has to select a configuration profile, and the reconfiguration software makes all of the requested changes as described above. The ability of the reconfiguration software to organize settings groups into named profiles enables the possibility of a user having multiple configuration profiles. One profile might be for home, one for work, one for travel, and so on. The initial reconfiguration list that the software receives is organized into profiles, and may contain more than one profile. The end user (or software) may then select the most appropriate profile.

The reconfiguration system module 526 participates in the security of the computer by providing a mechanism to ensure that the computer is in a known-good state prior to engaging in some other activity (e.g., signing onto a remote network or launching a sensitive application). The reconfiguration system module 526 returns a status code to its caller, indicating whether or not the reconfiguration was a success. A calling application can use that status code in making a security decision, e.g., whether or not to allow a user onto a remote network.

Operational Description

The reconfiguration system can be usefully applied to the case of remote network access. Users seeking remote access to network resources on a corporate, school, or home network, encounter unique challenges that are addressed directly by the reconfiguration system.

For example, suppose a user wants to access his company's network from his home computer. After a remote connection to the company network is established, the user will attempt to use resources on a client computer (e.g., web browser, e-mail client, etc.) to access the network's resources. It is unlikely, however, that these applications are properly configured to access these resources. This forces the user to know the technical details of how to configure his software for proper operation with the company network. Furthermore, it requires the user to undo any changes he makes at the end of his remote access session, because the settings that work for the corporate network are unlikely to work correctly for his home network.

The reconfiguration system modules 526, 626 cooperate to solve the general problem of software configuration management in the context of remote network access.

The reconfiguration module 622 in the server interfaces with the central policy manager module, which is a system that manages software policies and configuration settings across all remote network access clients. Many of these policies translate directly to settings on a user's computer. A policy can enforce the following reconfiguration-related requirements:

It may require a particular setting of a registry key

It may require a particular setting in a configuration file

It may require a particular high-level configuration setting

These settings are assigned by the central policy manager module 642 to each remote network access client via the reconfiguration system module 622. During the remote network logon process, the central policy manager module 642 builds a reconfiguration list and sends it to the reconfiguration system module 526 running on the client. The reconfiguration system module 526 carries out the actions in that list and reports success or failure back to the central policy manager module 642. The central policy manager module 642 then makes a decision as to whether or not to allow the client computer access to its target network. An analogous process occurs for browser-based connections.

The VPN client implements the reconfiguration system module 622 to act on the reconfiguration list that it is provided by the central policy manager module 642. On receiving a reconfiguration list as a part of the normal sign-on process, the VPN client starts the reconfiguration system module 526 and provides it with the reconfiguration list. The reconfiguration system module 526 then implements the settings changes listed in the reconfiguration list and reports its success or failure back to the client. The client relays that status information on to the central policy manager module 642 for target network access.

The browser-based client also implements the reconfiguration system module 526. During sign-in to the system, the client receives a configuration list and follows the same process as the VPN client in implementing that list via the configuration system. Again, status information is returned to the central policy manager module 642, which decides on whether or not to grant target network access.

The remote access client leverages the reconfiguration system to configure the following settings:

Antivirus settings—The Policy Manager specifies whether or not antivirus software is required to be installed and running on the remote access client, and if so, which versions of software are acceptable to the administrators. In addition, this policy allows for the specification of a maximum age of virus definition files. The reconfiguration system on the client then enables the antivirus software if necessary, updates virus definition files if necessary, and adjusts the settings of the antivirus software to comply with the Policy Manager's requirements.

Low-level settings—The VPN client manages various low-level computer settings on behalf of the Policy Manager. IP addresses are specified and configured according to the configuration list. Corresponding subnet masks, default gateways, DNS servers, WINS servers, and other parameters such as the interface's maximum transmission unit, are configured.

Web Browser—The user's web browser is configured to operate properly in the context of the target network. The user's home page is changed to match the home page on computers in the network. The user's proxy servers are updated to work with the target network's proxy servers.

The user's Favorites menu is populated automatically with links from the target network's intranet, so that the user does not have to remember addresses of critical intranet resources. Finally, the browser's security settings are adjusted to match the policy defined in the Policy manager.

E-mail—The user's e-mail settings are re-configured in the process of remote network sign-on. For example, if the user uses Microsoft Outlook on the computer, it is first set to the appropriate mode (workgroup mode in most cases). It is then configured with the name and address of the appropriate mail servers and the account name of the user. Other e-mail clients are configured in an analogous fashion.

Desktop and Other Resources—The computer-wide resources, such as the desktop, are reconfigured as a part of sign-on. Things that are changed include the background color and wallpaper, desktop shortcuts, and default file locations for applications.

Personal Firewall—the user's personal firewall is configured with appropriate rules as specified by the configuration list. These rules are entered into the firewall's configuration, and the firewall is set to filter packets.

Other applications—A key aspect of the reconfiguration system is its extensibility. As such, the VPN client provides a modular way to add additional reconfiguration capabilities as they are needed.

WebTop—The reconfiguration system is used in conjunction with the WebTop for several purposes. It is responsible for controlling the local web browser to use the WebTop client for access to the corporate network, via the browser's proxy settings. It is also responsible for reconfiguring the local 'hosts' database file to include required entries to get corporate network access. It manages "application tunnels" in the context of the WebTop process, and controls detailed network settings that allow the launching of remote client/server applications.

Local Proxy Module

Overview

One component of remote network access is providing access to corporate Intranets. Many corporations maintain extensive intranets, composed of internal websites, file servers, and other resources. Corporate intranet resources are generally not available to the public Internet, so a method of secure remote access is required. The traditional remote access methodologies, including dial-up and traditional VPN access, are able to provide remote users with access to these resources, but at a cost in complexity and maintainability.

A browser-only solution to remote Interanet access is preferable due to its deployment simplicity and maintainability. However, some unique problems exist that make this a difficult proposition. Web pages written in HTML, JavaScript, and similar languages, make use of embedded hyperlinks that contain pointers to embedded images, objects, and links to other web pages. These links contain references to server names that are generally not directly reachable from the public Internet, even in the case of using SSL. To enable such direct SSL access would require significant network redesign in most cases, including moving servers from the Intranet into a DMZ. This further weakens overall security, and many organizations are unwilling to make such compromises.

In addition to security problems, direct inbound access to Intranet servers from the public Internet is problematic from a management standpoint. Instead of having a single central access hub to the outside world that can be guarded and policed carefully, each Intranet server must be monitored and managed as if it is on the public Internet. Furthermore, there exist very few comprehensive management frameworks that can handle the added policy issues of having direct access to internal servers.

In recent years, a new class of hardware devices has been marketed to solve these problems. These appliances are structured as proxy servers that request content from the Intranet servers on behalf of remote access clients. Intranet resource access via these reverse proxies generally relies on a technology known as "URL rewriting". For the scheme to be effective, every hyperlink (or URL) in a document must be recognized and adjusted to refer back to the reverse proxy server. Failure to recognize or correctly adjust a URL leads to a broken hyperlink, which can manifest itself as a broken image, a link to another page, and so on.

There is a problem with this scheme, however. The languages and technologies used in the production of web pages are always changing. A reverse proxy server that is able to correctly identify 95% of all URLs in a set of documents at one point in time may do much more poorly on a similar set of documents six months later. This results in a situation in which the reverse proxy vendors must keep up with all of these changing and emerging standards of webpage design. In addition to the URL identification difficulties, there are problems related to the JavaScript language and its use in web pages that are impossible to solve by their very nature.

In addition, the reverse proxy scheme is plagued by other problems. Due to the fact that it has to read and re-write every webpage that passes through it, it is effectively a very high-delay network hop, resulting in poor performance. Rewriting is also a CPU-intensive process that, for all intents and purposes, cannot be accelerated by hardware. Finally, these products rely exclusively on the browser's SSL implementation for security. However, many networks are deploying SSL snooping and filtering, rendering the security useless. This results from the browser's use of the Public Key Infrastructure (PKI), and is unavoidable.

The browser-based client includes a local proxy module 530 that addresses all of the reverse-proxy concerns mentioned above. The local proxy module 530 is part of a software agent that is transparently downloaded and run by the web browser in a manner similar to other standard browser plug-ins.

The local proxy module 530 is a software agent that enables an end-user's browser to directly access protected corporate Intranet resources in a secure and efficient manner. The local proxy module 530 emulates a standard HTTP proxy server. The local proxy module 530 takes all requests from the browser for corporate Intranet resources and fetches the required resources via the WebTop VPN connection to the POP.

This local proxy scheme bypasses all of the difficulties of the reverse proxy solutions described above, because rewriting of the web page is not required. The local proxy module 530 simply intercepts all normal Intranet resource requests and handles them via the encrypted tunnel, rather than requiring the reverse proxy to adjust hyperlinks on the fly. This elimination of a problem domain results in a simpler, faster, and more effective solution to remote Intranet access.

Implementing a local proxy architecture via a VPN tunnel to a POP presents a number of challenges. Because the encrypted tunnel is constructed using a browser plug-in, the plug-in must read the browser's proxy server settings and use them if it is to be able to connect out through proxy servers. Once the proxy server is detected and configured, the local proxy module 530 must have a way of intercepting all communications between the browser and the corporate network.

For bandwidth and efficiency reasons, only traffic destined for the corporate network should actually be sent over the encrypted tunnel, so a way of separating traffic is needed. The local proxy module 530 addresses all of these concerns.

Exemplary Implementation

When a user requests a document from the corporate Intranet via the WebTop, the local proxy module 530 (implemented on Microsoft Windows as an ActiveX control and on other platforms as a browser plug-in) is started and configured. The local proxy module 530 builds a VPN connection to the IPSec concentrator using the VPN system (described elsewhere). Once this tunnel is established, the Local Proxy creates listening sockets (TCP servers) on the loopback interface on the standard proxy server ports.

Traffic is intercepted from the web browser by configuring it to treat the local proxy module 530 as its proxy server. Using the reconfiguration system module 526 the local proxy module 530 adjusts the web browser's HTTP, HTTPS, and FTP proxy settings to point to the local loopback interface (i.e., "localhost", Internet Protocol address 127.0.0.1), which is a standard interface present on all TCP/IP implementations for local services to use. The original settings are eventually restored by the reconfiguration system during sign-off.

Once the browser's proxy servers are set, all requests for data are passed to the local proxy module 530 via the loopback ports. The local proxy module 530 then analyzes each request as it is presented and acts on it. The most common protocol used on the Web is Hypertext Transfer Protocol, or HTTP. Two versions (1.0 and 1.1) are in common use today. The local proxy module 530 then directly passes the request via the tunnel to a remote proxy server, which fulfills the request on its behalf and returns the result to the client computer. The local proxy module 530 then returns that result to the web browser over the original loopback port. HTTPS (Secure HTTP) transactions and passive File Transfer Protocol (FTP) transfers are handled in exactly the same way, over their respective ports.

In many cases, it is not desirable to require traffic destined for non-corporate resources (e.g., public websites) to travel over the encrypted tunnel. The local proxy module 530 provides this functionality by altering its configuration of the web browser's proxy settings during the initial reconfiguration. Instead of using a single proxy server to handle all traffic, a Proxy Autoconfiguration (PAC) file is provided to the browser during the reconfiguration process. This PAC file lists specifically which servers must be accessed via the encrypted tunnel and which may be directly accessed.

Conversely, it is sometimes useful to require all web browser traffic to traverse the encrypted tunnel during an encrypted session. This is generally done for security and auditing reasons, and can be useful for limiting access to certain websites while the user is connected to the corporate network. With a traditional reverse proxy architecture, this is impossible.

Application Tunneling Modules

Overview

Most traditional VPN clients provide the end user with the ability to run any client/server network application over the secure remote access tunnels they create. However, WebTop, like most web-based remote access implementations, must provide all remote access services via only the web browser and associated components. Modules such as the virtual adapter module 522 (present in the VPN client) are not present in a WebTop client, and as such, the remote access client cannot create a true network interface for the forwarding of packets across the remote tunnel.

To address this need, the WebTop client includes an application tunneling module 534 and the server includes an application tunneling module 626. The application tunneling modules 534, 626 cooperate to enable the WebTop client to forward application-level data across the remote tunnel to the servers. This application-level data is captured by local proxy listeners, which are created by the policies defined for that WebTop user. To capture this user data, reconfiguration of the client computer is required. This is accomplished by changing entries in the computer's "hosts" file.

Host File Reconfiguration

Every computer has a local Internet hostname database known as a "hosts" file. This file contains mappings from Internet domain names (such as "abc.xyz.com") and Internet Protocol (IP) addresses (such as "123.234.123.234"). Software can call standard routines such as "gethostbynam( )" in order to determine the IP address that goes with a given name. Prior to querying the Domain Name System (DNS) servers, the local hosts file is queried. If the requested name is present in the hosts file, the IP address listed in that file is returned to the caller.

To capture application-level data generated by a network client, the client must connect to a local proxy listener. Network client software typically specifies a domain name in network connection requests. By adding the IP address of the local proxy listener (usually "127.0.0.1") to the hosts file and associating the name to which the network client software will try to connect with that IP address, the WebTop client can force that client software to connect to the local proxy instead of to the normal target network server.

By way of example, an intranet server named "Payroll" might have IP address 1.2.3.4 on the target network. Software on the target network software may be programmed to connect to that server upon start-up. During WebTop start-up, an entry maybe added to the hosts file that links the name payroll with the IP address 127.0.0.1. When the client software queries the IP address associated with the name "Payroll", using standard name resolution functions, the operating system returns the value "127.0.0.1" because it was present in the hosts file.

Each operating system stores its hosts file in a slightly different place. The application tunneling module 534 in the WebTop client relies on the reconfiguration system module 526 to locate and reconfigure the hosts file in a manner that is appropriate for the particular operating-system.

One drawback of the current solution is that every application must share a common loopback address for all of its local proxies. In some situations (e.g., when the user connects to several different TELNET servers), this is an inappropriate arrangement because it requires that each TELNET server be assigned a local proxy on a unique port, and only one of the local proxies can utilize the standard TELNET port, 23. All other servers must use other, random port numbers. These random port numbers may or may not be compatible with the client software being run by the end user.

To address this deficiency, the application tunneling module 534 in the WebTop client provides for per-address application tunnels. A requirement of all Internet hosts is the ability to treat any of the 16.7 million IP addresses starting with "127" as loopback addresses. In addition to 127.0.0.1 being a loopback, so is 127.0.0.2, etc. WebTop takes advantage of this situation by binding local proxies to different loopback addresses. Instead of the afore-mentioned TELNET client binding to many different ports on the address 127.0.0.1, it listens on only its standard port on several different IP addresses.

During reconfiguration, then, each unique hostname that is to be connected to (TELNET servers, in this case) is associated with a specific, individual loopback IP address. The end user's network client software must then only connect to the normal hostname (which is associated with a loopback address in the hosts file), on the normal port. Neither the user nor the client software can tell that there is a local proxy server between the client and the server.

Dynamic Application Tunnels

In addition to the statically-configured application-level data tunnnels described so far, it is often useful to have dynamic detection of application tunnels. This avoids administrative pre-configuration of hostnames, port numbers, and IP addresses. It also enables different classes of applications, such as those which randomly determine destination port numbers, to be supported by WebTop clients.

To achieve this, the virtual adapter module 522 may be dynamically installed on the end user's computer during execution of the client application tunneling module 534. This installation is accomplished by the standard installation routines. Once executing, the virtual adapter module 522 is configured to intercept any data sent to corporate network servers.

When data is detected to a new server on the corporate network or on a new port on a server, an event is set by the driver in the client application tunneling module 534. The client application tunneling module 534 reads the message and extracts the destination IP address and port number of the request packet. It then dynamically invokes the reconfiguration system module 526 to reconfigure the hosts file to add a new name-to-address mapping, and creates a new listening local proxy on the specified port number. Once this new local proxy is created, future executions of the network client application will correctly use the local proxy to connect to the server.

Another method that may be employed by the WebTop client is "DNS hooking". The WebTop client can invoke the reconfiguration system module 526 to reconfigure the user's DNS servers to point to loopback addresses for the duration of the application-level data tunneling session. Any DNS requests that are made to the application tunneling module 534 client cause the dynamic creation of listening local proxies on unique addresses, as described above. The application tunneling module 534 client then listens via a standard "raw socket" to all network requests sent to the newly-created local proxy address and creates listening local proxies on the appropriate port. This results in a successfully-established local proxy on the second connection establishment packet during the first connection setup attempt.

Complex Protocols

Client applications occasionally implement complex IP protocols. These protocols create outbound connections on randomly-generated or protocol-generated destination ports, and as such, cannot be pre-configured by the network administrators. Two examples of this behavior are File Transfer Protocol (FTP) and Remote Procedure Call (RPC). Complex protocols may be handled separately.

One way to handle complex protocols is by providing a per-protocol "helper" on the server side application tunneling module 526. The server's "helper" tracks communication between client and server, and when it sees a new connection set-up request in the data stream of the application-level data tunnel, it dynamically creates a new listening local proxy on the client, together with a corresponding tunnel endpoint on the server. This treatment enables complex protocols to function normally.

Complex protocols may also be handled by using one of the two dynamic application tunnel methods described above. As new outgoing requests are made, new application-level data tunnels are dynamically created by the client, allowing the network communication to take place.

NAT Agent Modules

NAT agent module 630 provides secure remote network connectivity from branch or satellite networks to the remote access servers, so that remote users will be able to access resources on those networks. The NAT Agent module maintains a WTP connection between itself and the servers, much the same way as a VPN client. In addition, NAT agent module 630 performs a network address translation (NAT) on incoming and outgoing packets to enable remote access to resources.

The NAT agent module 630 may be installed through a standard Microsoft Windows Installer package onto any Microsoft Windows computer (running Windows NT 4.0 or newer) at a satellite office. Once the NAT agent module 630 is installed, its first task is to learn about the network to which the computer it is running on is attached. NAT agent module 630 invokes the reconfiguration system module 622 to query for network settings, including Internet Protocol (IP) address, subnet mask, default IP gateway, Domain Name System (DNS) servers, and Windows Internet Name Service (WINS) servers. NAT agent module 630 also queries for any currently-connected network drives, the web browser's proxy and default homepage settings, and e-mail client settings. NAT agent module 630 stores all of this information in the system registry for future use. During the first connection to the server system, this information is transmitted for use by the servers in configuring policies and clients.

Once installed, the NAT agent module 630 checks for software updates and attempts to make a WTP connection to a remote access server(s). This connection is always maintained, unless the user chooses to disconnect the NAT agent module 630 from the servers. If the connection is lost for any reason, the NAT agent module 630 automatically re-connects to the servers.

Once the connection is made, the NAT agent module 630 begins to forward packets into and out of its network. The network address translation component is used to provide the remote user with access to any computer on the internal network, regardless of whether or not it is on the same physical subnet and the computer running the NAT agent module 630. This is useful because internal systems will generally have no IP routing information for remote access clients. Without translation of the incoming source address, computers on the internal network have no way of communicating back to clients of the remote access system.

Inbound packet flow is subject to source address translation prior to the packet being forwarded into the network. When the NAT agent module 630 receives an incoming packet from the WTP protocol, its source address is changed from its existing value (i.e., an address given to the computer by the remote access server, such as 2.0.0.1) to an IP address of the NAT agent module 630 computer's internal network interface. This interface was discovered during the installation and configuration phase, and is read from the system registry.

The IP packets are read from WTP and their source address is changed to the private internal address mentioned in the system registry. The packet is then re-assembled according to Internet standards and is forwarded on to the local network. The network then routes the packet correctly to the target server. Note that the address of the server is already correct by the time the packet reaches the NAT agent module 630, so the packet would have reached the server without rewriting.

However, the server would generally have no way of returning the packet to the remote access client.

When the source address is rewritten the NAT agent module 630 creates a translation table that maps the old address to new address. To prevent overlapping network port information, the source Transmission Control Protocol (TCP) or User Datagram Protocol (UDP) port is also changed to a random value. This re-written port number is also added to the translation table.

The processing of outbound packets is reversed. Each packet has its destination IP address rewritten from the IP address of the NAT agent module 630 computer's internal interface to the remote access client's address, as learned from the translation table. The destination port is also re-written, and the IP packet is re-constructed and handed to WTP for transmission.

For outbound communication from the network to a given remote access client, static reverse mappings are possible. These mappings are permanent entries in the translation table that enable a server to communicate with a client by using a pre-specified destination port and talking to the agent computer instead. The NAT agent module 630 computer performs the standard outbound translation, but it finds a pre-populated entry in the translation table, causing the outbound packet to go to a pre-defined remote access client.

Captive Portal System

To ensure the security of destination networks, the remote access system includes captive portal system modules 538, 634 that cooperate to the ability to limit client access to network resources. The captive portal system modules 538, 634 remove all network access to the target network, instead re-directing network requests to a remote access server. That server can choose to silently discard the data or to produce an intelligent error response indicating the captive portal condition. The current remote access system uses the captive portal system modules 538, 634 as a user-specified response to the violation of a configured policy, such as not having an anti-virus program activated on the client computer.

The captive portal system modules 538, 634 limit access by the client to the target network. Once the system decides to place the user's computer in the captive portal, the remote access servers signal the network routing equipment to re-direct all of that user's traffic to a special IP address on the network server. This prevents any access from a client computer to the corporate network, and also provides the network server with the ability to make an intelligent response to the network request, if possible.

With Hypertext Transfer Protocol (HTTP) requests, for example, the remote access server returns a normal web page describing the condition of being in the captive portal. This web page may provide a notification indicating that the user is in the captive portal, and may also provide information that the user can use to remove himself or herself from the captive portal.

Other similar responses are possible for other network protocols. File Transfer Protocol (FTP) servers are able to provide extended status information during protocol negotiation, for example. Other captive portal responders can be created on a per-protocol basis.

There are two user interfaces to the captive portal system. The first is a browser-based interface. When a captive portal condition occurs, any webpage that the user requests will result in the return of a special captive portal web page, as described above. In addition, upon detection of the condition, a web browser is opened automatically and pointed to the captive portal, thereby informing the user of the condition.

Upon clearing of the condition, the client can then automatically refresh the webpage to inform the user that the captive portal is no longer in force.

The second interface to the captive portal is based on standard Microsoft Windows user interface components. A standard Win32® interface is opened automatically for the client, with all of the same information as would have been in the browser-based portal screens. Note that the user of a Win32 captive portal interface does not affect the fact that connections are still intercepted.

Network Backup System

The remote access client software includes a network backup module 562 to facilitate better work practices on the part of end users. The network backup module 562 is based on the standard backup and restore paradigms present in many commercial software packages. Network backup module 562 provides a user interface that allows the client to select files for backup and restore, schedule backup jobs, etc. The network backup module 562 cooperates with the network backup module 646 on the server to back up and restored files from the remote access servers.

Network backup modules 562, 646 invoke RSYNC modules 542, 638, respectively, to provide compatibility with the RSYNC protocol for network file transfers. This means that a full file transfer is only required on the first back-up operation, or when every byte in the file has changed. The more common localized file changes result in only the changed portions of files being sent over the network. Restoration of a previous version of a file similarly results only in the transmission of the file's differences, resulting in a significant savings in bandwidth. This can be particularly important in the context of a dial-up modem connection.

The RSYNC algorithm is used on the remote access server to maintain a long list of incremental backups. The most recent copy of the backed-up files is stored in full, but only binary differences are stored for previous versions of the files. This results in an optimally space-efficient storage system, enabling the retention of a large number of backed-up file versions.

Because of this capability, the user is able to select any historical version of a file for restoration. This capability is useful in the case of a locally-damaged file whose (incorrect) changes have been backed up a number of times prior to the discovery of the damage. When a user requests a historical version of a file, the file is patched with successive sets of binary differences until the correct historical version is reached.

The file backup system can be configured to automate file backup in several situations. Users can configure individual files (or groups of files, known collectively as a "job") to be automatically backed-up on logon to the system, logoff from the system, or on a scheduled basis. The use of software to detect file changes enables backup-on-change ability. In addition, a file or job can be backed up on demand by the user.

Bandwidth-Sensitive Policy Application

Many policies in the remote access system are sensitive to the bandwidth (or speed) of the end user's connection to the server software. This speed sensitivity allows the system to alter policies to accommodate slow links such as, e.g., dial-up modem-based end users.

The determination as to whether an end user is on a slow link is made in one of several ways. Many modems and other network connections report connection speed to the operating system via various methods. The remote access client software queries this speed. In addition, the presence of a remote access connection using the Point-To-Point Protocol (PPP) is a strong indicator of a slow connection. In some cases, a direct measurement of the network speed is possible. Finally, the user can be prompted to select whether or not the current network connection is slow; however, this is not a trustworthy way to determine connection speed.

A number of policies are affected by the speed test. In general, any policy that involves the transfer of files is a policy that administrators may want to change if the connection speed is slow. Queued file updates, updater files, antivirus definition files, and application distribution are four examples. In general, however, any policy whatsoever can be selected as bandwidth-sensitive, and policies with advanced bandwidth support can be configured to react differently to high- and low-bandwidth situations.

SuperNAT

The remote access system supports a centralized service-provider-style implementation, in which a number of different target networks are connected to a single remote access server or a single cluster of servers. In this case, the servers require special network routing to be able to communicate with hosts inside the various target networks, due to the fact that each target network might use the same internal IP addressing.

In an exemplary implementation the SuperNAT system 226 resides in the POP, and provides network routing services. In order for a server to communicate with a target computer, the server must have a way of uniquely specifying that computer. If several target networks have computers with the same IP address, that address (and by extension, the DNS address) can no longer be used. To address this issue, the SuperNAT system 226 assigns each remote system on a target network a private, global IP address (such as 1.254.0.1), which is guaranteed to not overlap with any other computer's address. Network traffic destined for the target computer is instead sent to the private global address.

SuperNAT acts as a network router between the server and the target network. When it receives traffic that is destined for a private global address, it performs two updates to the header information of that packet. The first is the substitution of the destination address with the true destination address (such as 10.0.0.1). This address may overlap with other network addresses. It then marks the packet with a source address to allow for source routing of the packet into the correct target network. The special source address uniquely identifies which network the packet should be sent to.

The packet eventually arrives at the destination server by means of standard IP routing over the remote access system. Response data is sent back to the rewritten source address that SuperNAT system 226 added to the packet header. Normal IP routing will cause the packet with the rewritten address to be routed through the SuperNAT system 226. When the SuperNAT system 226 sees one of its "special" addresses in the destination of the IP packet, it substitutes the "special" address with the address of the server that had originally made the request. It also switches the source address to be the private global address that was originally specified as the packet's destination.

Because there is always a unique identifier in every packet at every point, normal IP routing and IP source routing can be used to ensure traffic is presented to the correct network servers.

Application Distribution

The remote access system provides a facility for the distribution of applications to end users. The application distribution modules 558, 658 cooperate to provide for the distribution of applications that the user may choose to use in conjunction with the applications content module 562. The application distribution system includes an application inventory methodology and an application packaging methodology.

Application Inventory

The application inventory system prepares a inventory of applications installed on a client computer. This knowledge is used for many purposes, including making an intelligent decision as to which applications to offer the user for distribution, how to handle the distribution and installation (i.e., upgrades may be handled by different means than fresh installations).

The application inventory system is based on a system of detection hints. There are two kinds of detection hints currently defined: registry hints and file hints. In addition, other kinds of hints may be defined as the target platforms allow. These hints are taken together to allow the system to make a decision as to whether an application is installed.

Registry-based hints are used primarily on Windows platforms. They may consist of fully-qualified registry keys, relative registry keys, registry value names, registry value types, and registry value data. Decisions can be made based on the existence of any combination of these hints, whether data exists or whether it is set to specific values or ranges of values, or any other logical combination. The hints can be specified to be logically ORed, ANDed, or some combination of the two.

File-based hints are used on all platforms. They may consist of fully-qualified path names or relative path names, be directories or files, and optionally include required contents of files or MD5 fingerprints. Decisions can be made based on the existence of any combination of these hints, whether files exist or whether specific data are required in the files. The hints can be specified to be logically ORed, ANDed, or some combination of the two.

Based on these hints, the application inventory system makes a conclusion as to the presence or absence of the application on the user's computer. It makes this conclusion based on a definable set of rules based on the results of the hints. For example, some applications require that all hints be present, whereas others may require that any single hint is sufficient to prove an application's existence.

In an exemplary implementation, the results of the hint detection from the user's computer are transferred back to the central policy manager module 642 on the server for archiving and use by other components of the Inventions.

Application Packaging

In an exemplary implementation applications may be package for distribution according to the following guidelines:

Installation packages are a single file.

Installation packages are as small as possible to conserve network bandwidth.

Installation packages are straightforward for the user to operate, and are able to be started in an automated fashion (e.g., by the application distribution content module or a related module).

Installation packages are straightforward to create.

Installation packages are compatible with any third-party application's native installation system.

All application packages are wrapped into a single executable file for the target operating system. In the case of the example implementation, they are Windows executables. Production of an executable installation package involves the following steps:

A "cabinet" file is made of the application's installation source files. Cabinet files are standard file aggregation and compression files, as frequently implemented by Microsoft and others. In the production of the cabinet file, the expected directory structure of the installation sources is reproduced in the cabinet file.

Depending on the kind of installation package, an automated installation script may be added to the cabinet file. This is produced for InstallShield-based installers using the standard -r and -s switches. More about this procedure can be read from http://www.installshield.com. The sample implementations of Electronic Timesheet and Citrix Client use this process.

The Cabinet file is integrated into an executable file. The executable is configured to properly extract the cabinet file, extract the installation source from the cabinet file, start the installation, wait o the installation to complete, and exit gracefully, informing the user of success. It is also programmed to handle exception conditions, including not enough disk drive space, not enough privileges to install the software, and others. It can be customized to any required extent to allow for peculiarities of the given software.

Applications Content Module

The applications content module 564 cooperates with the application tunneling module 534 to provide application level data tunnel connections from a client computer to the target network. This functionality allows users to use non-web-enabled client-server applications via WebTop to access target network resources.

The applications content module 564 invokes the user interface module 514 to present the user with a list of available applications, as configured by the administrator in the centralized policy manager module 642. These applications can include any client-server application in use on the target network.

Two different methods of application delivery are supported by WebTop. The first is on-demand distribution. With on-demand distribution, the requested application is transferred to the user's computer and executed automatically as a result of the user's clicking on the corresponding application link in the applications content module 564. This method may be implemented in by integrating the application level data tunnel functionality of the client. Alternatively, this method may be implemented bundling the application in a separate web-based client executable.

In addition to on-demand distribution, applications can be distributed by the Application Distribution Content Module, described above. Note that there is no technical reason to choose any of these methods over another—considerations such as application size and complexity of installation drive this decision. Currently, applications including Microsoft Outlook, Novell Groupwise, and many others are distributed in this fashion in the example implementation of WebTop.

Once distributed, the application tunneling module 534 on the client reconfigures the computer as necessary. In particular, the computer's DNS table may be overridden to allow the requested application to make connection to the application tunneling module 534 on the client rather than to its usual server on the target network. In addition to reconfiguration, the application tunneling module 534 on the client establishes itself as a server on the port configured by the administrator.

At this point, the application tunneling module 534 on the client makes a WTP connection to a WebTop server and authenticates itself. It then informs WebTop of its intent to tunnel application traffic for a user and sets up the appropriate session information in WebTop. Once reconfiguration is complete, the requested application is launched on the user's computer. The application then makes all of its network connections to the application tunneling module 534 on the client, which forwards data on to the WebTop server for transmission on the target network. Return traffic is sent from WebTop back to the application tunneling module 534 on the client, which forwards it on to the application.

At the conclusion of the session, the application is closed, and the application tunneling module 534 on the client reconfigures the user's DNS system and exits.

This architecture and system allow any non-web-based application (which is nearly all client-server applications in current use) to be used successfully over a standard Web-based connection, using nothing but a standard web browser. Please refer to the implementation details section for more information.

The particular applications available to a given user are configured by the administrator via the Centralized Policy Management System.

The Content Module presents the user with a list of applications. The user is free to click any of the applications, thereby initiating a download to the computer of the Application Distribution Agent. The agent executes within the user's web browser and queries the computer for the status of the selected application. If the computer already has the application installed, the user is prompted to confirm that he still wishes to download and re-install the selected application. Otherwise, the application downloads.

Once the application is downloaded to the user's computer, an application distribution agent executes an application installation procedure, which installs the requested application.

Application Distribution Module

To prepare an application for distribution, it is packaged into an application distribution package by network administrators. This package consists of a "wrapper installer" that pre-selects any installation options and runs without the need for user intervention.

The installation wrapper is generally composed of two parts. The common part consists of software to package and extract the application's installation files, to launch the installation, and to wait on the installation for completion. Generally, some package-specific development is also required to ensure automation and a smooth installation. These two parts are compiled, together with the original software installation package, into an application distribution package.

The Policy Manager is configured to allow users access to downloadable applications in two places. First, a company entity in the policy manager must be given access by administrators to an application in order to make it available for distribution to end users. Once made available, a normal application distribution policy is required to assign the end user the application for download.

Once assigned, the user will receive notification from the client software that installable applications are available for download. A standard Win32 interface is provided for the downloading and installation of the installation packages. The client software uses a set of application-specific hints to pre-determine whether the application is already installed on the end user's system, and only allows download of the application if it is not already present on the computer.

Occasionally, an application is so important to a user's remote access experience that network access should be denied unless that application is installed on the user's computer. This is accomplished by setting a user's distribution policy for a given application to "required". If an application is required, the user is put into the captive portal until the application is downloaded and installed on the computer.

Authentication and Security in Webtop

WebTop is primarily intended to provide secure remote access via Web technologies. Authentication is a key ingredient in a secure system. WebTop makes use of standard user authentication methods. WebTop is designed to interoperate with any standard authentication mechanism.

By connecting to WebTop, the user enters a standard encryption mode known as Secure Sockets Layer (SSL, also known as Transport Layer Security, or TLS, as standardized). This SSL-based connection is encrypted and the WebTop server is authenticated to the end user, to prevent various forms of security attacks. The level of security and related parameters can be tuned by the Centralized Policy Management System.

All users are required to "sign on" to WebTop by providing a valid user name and authentication token. Common authentication tokens are passwords and SecurID passcodes. Any similar authentication scheme, such as RADIUS, is supported by WebTop.

As an authentication source, WebTop can either use a locally-defined pass token database as controlled by the Centralized Policy Management System, or it can "pass-through" authentication requests to connected target networks, where authentication servers there can allow or deny access.

If the user's credentials are validated, the web browser will load the main WebTop web page and work can begin.

Webtop Interface and Capabilities

Upon being authenticated, a user is presented with the main user interface of WebTop. The interface is designed to allow users easy access to the main functionality of WebTop. The interface is divided into a control bar at the top with options to set preferences, sign off, or directly access a feature of the program, and a main area with one or more Content Modules.

A Content Module is a discrete piece of WebTop functionality. Content Modules with complete example implementations include E-mail Access, Intranet Access, Remote Desktop Access, and Network File Access. Functionally, these can be divided into two general areas—SSL-based Content Modules and AppTunnel-based Content Modules. AppTunnel functionality is described above.

An administrator has full control over which content modules appear to the user, and in what way the modules are laid out on WebTop's main web page. These settings are made via the Centralized Policy Management System.

In addition to configuring which content modules are available, administrators may configure many other policies related to the end user's network access experience. Central to this method of remote network access is the notion of resource access controls. One of the key improvements of a web-based solution to remote access over a network-based solution is the ability to impose arbitrarily fine-grained access controls to user resources. In particular, per-user (or per-group or per-company) access controls can be defined for all file-based resources, all intranet-based resources, remote desktop access, application tunnels, applications available for distribution, servers allowable for remote client connectivity, in the current example implementation. This methodology allows that all resources of all types be protected by fine-grained access controls. In the example implementation, these are configured by the Centralized Policy Management System.

SSL-Based Content Modules

There are four SSL-based content modules, in addition to the authentication prompt and the Main User Interface. For the purposes of this document, the User Preferences Module will be considered a Content Module, even though it does not provide access to target network resources. In addition to the above, the Intranet Access Content Module has a mode that uses SSL.

User Preferences Content Module

The User Preferences module allows the end user to set various preferences related to WebTop and to target network access in general. Configurable parameters in the example implementation include Desktop Wallpaper choice and Intranet Access Method. Wallpaper Choice is described fully later in the section describing the Centralized Policy Management System. Intranet Access Method is used to set the preferred mode for the Intranet Access Content Module. The two modes will be described in the section describing the Intranet Access Content Module.

Network File Access Content Module

The Network File Access Content Module enables users to access files located on target network servers. The Content Module presents the user with a list of file servers that has been configured by an administrator via the Centralized Policy Management System. The user can either use any of the preconfigured servers, or can choose to connect to other arbitrary servers in a manner similar to the Intranet Access Content Module. Bookmarks are provided for frequently-used locations to speed access to target network resources.

The module supports target network servers that implement the Server Message Block Protocol or the File Transfer Protocol. For details of the low-level processing of the Network File Access Content Module, see the Implementation Details section.

On connecting to a server, the user is presented with an interface with capabilities including downloading, uploading, deleting, renaming, and moving files. The interface is loosely based on the interface in the Windows Explorer File Manager, and as such, offers a comfortable look and feel. See attached screen shots for details.

E-Mail Access Content Module

The E-mail Access Content Module allows users to access e-mail on the corporate network. It is configured by the administrator in the Centralized Policy Management System. It is implemented in two different ways.

The first implementation is based on simple SSL-based access to target network mail servers' pre-existing web interfaces. This is implemented in conjunction with Microsoft's Outlook Web Access, Novell's Groupwise Web Access, Hewlett-Packard's OpenMail Web Access, or others. The user is presented with the native interface of the e-mail system.

The second implementation is novel and is based on a server-based solution known as the MAPI Proxy, named after the mail server standard MAPI. See the appendix on MAPI for more information. In this solution, WebTop connects to a separate MAPI Proxy server and requests the user's e-mail and related data in a low-level format from that server. The MAPI Proxy then communicates directly with the target network servers and retrieves the requested data.

Intranet Access Content Module-SSL Mode

The Intranet Access Content Module can operate in one of two modes: SSL-based or AppTunnel-based. In SSL mode, the module uses a Web Address Rewriter to pass target network web pages through to the end user In addition, the module allows the setting of bookmarks by the user, which can be used to quickly jump to target network resources. These bookmarks are kept sorted by frequency of use on the front page of the content module. The module also includes an address bar into which a user can enter an arbitrary target network address.

The Module Page of the Content Module allows for full control over the list of target network bookmarks. Users can create, delete, and group bookmarks in a convenient fashion.

Additionally, this module provides support for administrator-defined access controls, as configured in the Centralized Policy Management System.

Application Distribution Content Module

The Application Distribution Content Module is responsible for distribution of applications that the user may choose to use in conjunction with the Applications Content Module. The particular applications available to a given user are configured by the administrator via the Centralized Policy Management System.

The Content Module presents the user with a list of applications. The user is free to click any of the applications, thereby initiating a download to the computer of the Application Distribution Agent. The agent executes within the user's web browser and queries the computer for the status of the selected application. If the computer already has the application installed, the user is prompted to confirm that he still wishes to download and re-install the selected application. Otherwise, the application downloads.

Once the application is downloaded to the user's computer, the Application Distribution Agent executes the Custom Application Installation Package, which installs the requested application. Once finished, the Application Distribution Agent removes the Installation Package, leaving the application installed.

APPTunnels Architecture

The AppTunnels Client, in conjunction with the WTP protocol, enables the transmission of arbitrary network data to WebTop servers for further routing into the target network, and the receipt of traffic from WebTop coming in from the target network.

Using the technology of AppTunnels, non-web-enabled client-server applications can be enabled to run using the web browser as the VPN. WebTop allows for the configuration and customization of which applications to tunnel, which users will be allowed to tunnel which applications, and technical details relating to each tunneled application. Note that, as with all aspects of WebTop, per-user/per-group/per-customer policy decisions may be made regarding access controls. Included in the AppTunnels support is the capability for the administrator to select the most appropriate optimizations and algorithms to be applied to the AppTunnel.

AppTunnels are implemented in the WTP protocol (described later in this document). Therefore, they are able to traverse all corporate proxy servers and firewalls, as long as any general web access is available.

The AppTunnels Client is implemented as an executable component that is incorporated into and run by the user's web browser. For recent versions of Microsoft Internet Explorer, this takes the form of an ActiveX control. For other browsers or other platforms, a Netscape Plugin is used. The combination of these methods provides universal support for all but the most esoteric computer systems.

The AppTunnels method of interception of traffic in order to tunnel it is as follows: First, the computer's DNS resolution system is modified to re-route traffic for target network servers to the local computer. Next, the AppTunnels Client establishes itself as a server on the port that the application would expect to connect to. Once established, applications transparently connect to the Client on the local computer rather than to their natural target-network servers. No configuration or modification of the tunneled application is necessary. The AppTunnels method can be used to tunnel any user-mode data over a tunnel to WebTop. This includes TCP and UDP on all platforms. Other protocols may be available for tunneling, depending on the platform.

Support for Complex Protocols

The AppTunnels architecture supports complex network protocols such as FTP, RPC, H.323, and other proprietary multi-connection protocols. It provides this support by inspection of protocol data at the WTP server. A Protocol is termed 'Complex' if it requires more than a simple client-to-server TCP connection.

In general, any complex protocol may be supported by adding application-layer support to the WTP server for inspection and maintenance of that protocol. This is similar to the process undertaken by Network Address Translations in their popular form (see IETF documentation). AppTunnels operates on complex protocols by providing a gateway function. Following is a description of an example implementation of complex protocol support for FTP.

APPTunnels Support for FTP

File Transfer Protocol (FTP) is a complex network protocol. It maintains a control connection and dynamically creates data connections in the direction of server to client. FTP support is implemented as follows.

The WTP server knows in advance if the AppTunnel that is created by the TCPTUNNEL_START is FTP. This is configured via the Centralized Policy Management System. If it is FTP, WebTop monitors all communications via TCPTUNNEL_DATA request messages.

When a PORT command is sent, WebTop dynamically builds an additional AppTunnel based on the contents of the command. The new tunnel is indicated via a WTP message to the client.

The client adds the additional AppTunnel to its list of AppTunnels that it is maintaining.

Meanwhile, WebTop allows the PORT request to be passed onto the target network server. The target server connects back into WebTop on its new listening port. Communications are queued via RECV responses to be sent to the client.

Normal TCPTUNNEL_DATA/RECV processing continues. With the client and WebTop forwarding data on the new tunnel as they had on the original tunnel.

Content Modules that make use of AppTunnels support include the Intranet Access Content Module, the Remote Desktop Access Content Module, the Applications Content Module, and the Remote Terminal Client Content Module. All of these are implemented in the example implementation.

APPTunnels Support for Network Server Software

AppTunnels is able to support incoming connections ("network servers"). No changes to the server software are required in order to take advantage of this functionality.

To configure server-style AppTunnels, an administrator sets up an AppTunnel in the normal fashion in the Centralized Policy Management System, and marks it as a server tunnel. webtopd takes note of the server tunnel during initialization (specifically, during GETCONFIG processing) and establishes a listening server at that port. When data comes into that port, it is queued as RECV messages in the normal way, with the proviso that new tunnels are dynamically created in webtopd as each new incoming connection is established. The RECV messages indicate that new tunnels were created to the client via an extension header (Webtop-Server) in the RECV messages.

The AppTunnels Client handles all other aspects of the communication in a normal way. Incoming connections are added as Webtop-Server messages are received, and incoming connections to listening servers are created in the usual manner.

APPTunnels Support for UDP

AppTunnels implements support for UDP in a straightforward way. When an AppTunnel is configured to be a UDP tunnel, it is marked by a custom WTP header in the TCPTUNNEL_START, TCPTUNNEL_STOP, TCPTUNNEL_DATA, and RECV messages. That header is Webtop-TunnelType. When tunnels with a type of UDP are created or serviced, the only changes are minor sockets-code changes appropriate to the implementation of UDP clients and servers. All other processing proceeds as already described.

UDP may be used for server-based applications in the same way as any other protocol. See the previous section for details.

APPTunnels Architecture in Conjunction WITH .NET

The use of WebTop to deliver and connect .NET applications has the ability to make NET applications truly usable from anywhere, including behind corporate proxy servers and firewalls. The strength of NET is that it relies only on Web-based technologies to access and connect application components APPTunnels Platform Support AppTunnels is specified here in a platform-independent way. Any standard computer hardware and software will be able to implement the AppTunnels architecture.

Initial example implementations are primarily based on Microsoft Windows clients using a technology called ActiveX to inject executable code into the Internet Explorer web browser. However, there are other ways to inject code into the web browser, including Plugins. In addition, the notion of running code inside a web browser is not limited to Microsoft platforms—nearly any platform that can run a web browser can run plugin-based applications as well.

Intranet Access Content Module—APPTunnels Mode

The Intranet Access Content Module can operate in two modes: SSL mode, which was previously described, and AppTunnels mode. The Content Module retains all features previously described; only the underlying methodology for transfer of the website data is changed.

It will be noted that all of the details relating to AppTunnels described in this section are present in all implementations and uses of AppTunnels unless stated otherwise. Description in this section is not meant to imply that the following methods are only relevant in the context of this Content Module.

One early action that the Client takes is to execute the process of Proxy Settings Reconfiguration. Proxy Settings are settings present in all common web browsers that allow the use of proxy servers.

In AppTunnels mode, the user's computer transparently and automatically receives a module called the AppTunnels Client, which runs on the user's computer inside the web browser. The client then executes a number of actions on the user's computer. When these actions are complete, the user's web browser is able to access target network web pages by proxying requests through the AppTunnels client. The Client forwards the requests to a WebTop server, which retrieves the requested document and returns it to the Client, which in turn returns it to the web browser. The use of proxy technology is common and standardized. However, its use to provide access to target network resources as will be described is completely novel.

In summary, the following process takes place. The Client first reads the Proxy Settings configuration from the user's web browser. The mechanism is platform-dependent. The Client then stores that information away and configures the browser to use a Proxy Auto-configuration File. This file instructs the browser to request its new proxy settings from the AppTunnels Client. The request is made and replied to, and the new settings cause all further requests for documents to be proxied through the AppTunnels Client.

The AppTunnels Client then establishes a connection to a WebTop server and authenticates itself. After authentication, the Client establishes itself as a server application and listens for incoming requests from the browser. As requests are received, they are forwarded to WebTop. Responses are read in from WebTop and are sent back to the waiting browser. At the conclusion of the session, the user's browser is reconfigured to its original settings based on the information saved earlier in the process.

The design of the AppTunnels Client allows for the implementation of "split proxying". This capability allows the browser to be configured to tunnel requests for the target network over the AppTunnel, but to make direct requests for Internet-based websites. This is an analogous concept to that of "split tunneling" in the Network-based VPN world. This is also implemented by the example implementation. Configuration of split proxying is done via the Centralized Policy Management System in the example implementation. This implementation allows for the arbitrary specification of which websites will be tunneled and which will be directly requested.

AppTunnels proxy traversal technology includes the ability to traverse any suitable proxy server. In particular, HTTP and SOCKS proxies are specifically supported by the default protocol. Example implementations exist that correctly handle HTTP proxy pass-through.

AppTunnels proxy traversal technology is also able to handle proxy servers which require authentication. To implement this, the AppTunnels client probes a proxy server by sending a WTP ping message to the WTP server. If the WTP ping response is received, the AppTunnels client assumes that the server is reachable and that the intermediate proxy server, if any, does not require authentication. If, however, no response is received, or if a response is received indicating that the intermediate proxy server requires authentication, the AppTunnels client prompts the user for proxy credentials. The user enters a username and password, and the AppTunnels client uses these credentials in all further transactions with the proxy server.

Remote Desktop Agent Content Module

The Remote Desktop Agent Content Module is designed to allow users to access computers on the target network via a remote "terminal"-like application. The user can use this connection to directly control a computer in the target network.

In order to be available for connection in the content module, a user must install the Remote Desktop Agent on the computer in the target network (the "target computer") and register the target computer with WebTop. This is done by clicking an "Install a Remote Desktop Agent" link in the Content Module.

Registered target computers that are running the Remote Desktop Agent and connected to WebTop are listed in the Content Module. In order to connect to a listed target computer, the user must click the link representing the target computer's name.

This triggers the download and execution in the browser of the AppTunnels Client. The Client connects to a WebTop server and authenticates itself. It then establishes itself as a listening server on the user's computer. The AppTunnels Client extracts the Remote Desktop Viewer and causes it to execute on the user's computer. The Viewer makes a connection to the AppTunnels Client, which sets up a tunnel to forward the Remote Desktop data back and forth to the user's computer via WebTop and across the target network.

When the session is over and the user closes the Viewer and the Client, the connection to WebTop is broken. No reconfiguration to the user's computer is necessary in this case.

Applications Content Module

The Applications Content Module is responsible for providing AppTunnels connections from client computer to the target network. This functionality allows users to use non-web-enabled client-server applications via WebTop to access target network resources. This addresses a key problem in the deployment of Web-based VPNs by adding functionality that is completely novel in this context.

The Content Module presents the user with a list of available applications, as configured by the Administrator in the Centralized Policy Management System. These applications can include any client-server application in use on the target network.

Two different methods of application delivery are supported by WebTop. The first is on-demand distribution. With on-demand distribution, the requested application is transferred to the user's computer and executed automatically as a result of the user's clicking on the corresponding application link in the Content Module. This method is implemented in two ways. The first method is AppTunnels Client integration, in which the application is included with the AppTunnels Client. The Remote Desktop Viewer and the Remote Terminal Client are examples of this. The second on-demand distribution method is by bundling the application in a separate web-based client executable. See the Implementation Details sections for more information on on-demand distribution.

In addition to on-demand distribution, applications can be distributed by the Application Distribution Content Module, described above. Note that there is no technical reason to choose any of these methods over another—considerations such as application size and complexity of installation drive this decision. Currently, applications including Microsoft Outlook, Novell Groupwise, and many others are distributed in this fashion in the example implementation of WebTop.

Once distributed, the AppTunnels Client performs various reconfiguration tasks using the General Reconfiguration Methodology. In particular, the computer's DNS table must be overridden to allow the requested application to make connection to the AppTunnels client rather than to its usual server on the target network. See the appendix on DNS for more information regarding this technology. In addition to reconfiguration, the AppTunnels Client establishes itself as a server on the port configured by the Administrator. See the Implementation Details section for more information.

At this point, the AppTunnels Client makes a WTP connection to a WebTop server and authenticates itself. It then informs WebTop of its intent to tunnel application traffic for a user and sets up the appropriate session information in WebTop.

Once reconfiguration is complete, the requested application is launched on the user's computer. The application then makes all of its network connections to the AppTunnels Client, which forwards data on to the WebTop server for transmission on the target network. Return traffic is sent from WebTop back to the AppTunnels Client, which forwards it on to the application.

At the conclusion of the session, the application is closed, and the AppTunnels Client reconfigures the user's DNS system and exits.

This architecture and system allow any non-web-based application (which is nearly all client-server applications in current use) to be used successfully over a standard Web-based connection, using nothing but a standard web browser.

Remote Terminal Client Content Module

The Remote Terminal Client Content Module allows WebTop users to connect to legacy terminal-based applications on target network servers. These applications can be based on TELNET, SSH, TN3270, or any similar protocol.

The administrator configures a set of target servers in the Centralized Policy Management System, and the user is presented with these servers in the Content Module. In addition, there is an address bar that allows the user to type in any server and port and be connected automatically. There are bookmarks lists similar to those in the Intranet Access Content Module.

When the user clicks on a server, the AppTunnels Client is downloaded to the user's computer and launched inside the web browser. The client immediately extracts the Remote Terminal Client and connects to a WebTop server. It authenticates itself and retrieves its configuration. It then reconfigures the computer's DNS system using hosts file reconfiguration, implementing the General Reconfiguration Methodology.

The AppTunnels client then establishes itself as a server on the local computer and executes the Remote Terminal Client. The Remote Terminal Client connects to the AppTunnels client, which forwards data via WebTop to the target network server. Return data is forwarded by WebTop to the AppTunnels Client, which forwards the data to the Remote Terminal Client. In this way, communication is established.

At the completion of the session, the AppTunnels Client reconfigures the computer's DNS system, disconnects from WebTop, and exits.

Central Policy Manager Module

The inventions comprised by WebTop and the Improved Network-based VPN System, in their example implementations, make use of a central policy manager module. The job of the central policy manager module is to coordinate and assign all policy decisions to end users of the systems. This powerful system of databases, servers, and proprietary algorithms enables each user of the service to receive a custom set of settings and policies conducive to remote access. It is designed for use by employees in an administrative role, called Policy Manager Admins.

Policy Manager Admins can manage users at several levels ("Policy Manager Layers"). Each organization is represented in the System as a customer and can be managed at the corresponding Policy Manager Layer, the "Customer Layer". Customers are divided into one or more "groups", and each group holds an arbitrary number of users. Similarly, this is referred to as the "Group Layer". Groups may not be members of other groups, and all users must be members of exactly one group. This is referred to as the "User Layer".

Each customer has a logically separate web interface for managing its groups and users with which to enforce its policies on the remote environment. For example, the customer can require that the remote PC must be running a firewall with a particular rule set before access to the corporate LAN is allowed. Similarly, it can require that the remote PCs do not permit their drives to be shared while signed onto the system. This engine that permits hundreds of Policies to be pushed in real-time to each user, so that the company has maximum flexibility in creating user environments that fit its business needs.

Policy Manager Admins may be given rights to manage specific Policy Layers, which allows their rights to be limited to specific groups or specific users within the system. They may also be given rights to manage all Policy Layers for a certain customer.

The central policy manager module keeps track of all original state information, so that upon signing off of the Improved Network-based VPN System, the user's system is automatically restored to its original condition. Even the most detailed application settings can be managed centrally if so desired by the company.

Policies are defined by an association of two components: a Policy Type and a Policy Value. Each Policy Type is designed to handle a specific type of configuration setting or security rule. The Policy Type defines the nature and format of the Policy Value that will be associated with the Policy. A Policy Type also defines a Policy Category, a Policy Name, a Policy Description, and a Policy Type Form. Similar Policy Types are grouped into Policy Categories for ease of display and management. The Policy Name and Policy Description are used to aid the administrator in deciding what Policy Value might be appropriate for a Policy of a particular Policy Type. The Policy Type Form is a web-based interface tailored to the requirements of each Policy Type. The Policy Type Form may be defined in terms of HTML, XML, or any other markup language.

Policy Values can be binary in nature (e.g. "True" or "False") or they can be references to more complex data structures which reside in an external database (e.g. firewall rulesets). Policy Values may also be associated with a variety of possible Actions, which can be configured separately for each of the Policy Layers. Policy Values are configured with the appropriate set of Actions for the system to take when violation conditions are discovered. These actions are implemented in real-time, as the Centralized Policy Management System is in constant, real-time communication with the user's Network-based VPN client or the Web-based VPN Client while the user is signed on to the system.

For example, a Policy Manager Admin may create a policy of the Policy Type "Applications Available for Distribution". Then, the Policy Values are selected on the Policy Type Form. In this example, "Microsoft Word" and "McAfee VirusScan" may be among the options. Next, the Policy Manager Admin associates this information with the chosen Policy Manager Layer, such as "Office Managers" at the Group Layer. Actions to associate with this Policy might include "Disconnect user if the application is not installed on their PC."

Policies (including configuration settings and parameters) are defined and are assigned at any of Policy Layers within in the Centralized Policy Management System. Values are inherited from the level above if no explicit value is defined for a level. The Centralized Policy Management System handles resolution of conflicts and boils the assigned policy tree down to specific policy/value pairs for users.

Policies and their corresponding actions may be grouped into entities known as Policy Sets which can, in turn, be assigned at any of the Policy Layers. This is used to ease the management of users with common settings or environments that do not share a common group.

Implementation Details

This section details the implementation of various components of the Inventions described in this disclosure. These details relate only to the example implementations of the inventions, and are not necessarily requirements for all implementations of the inventions.

WebTopd

WebTopd is implemented to be WebTop's WTP server. The roll of the WTP server in WebTop is to provide for two major pieces of functionality: AppTunnels support and HTTP Proxying of client requests for web documents.

WebTopd is designed to run on UNIX-based computers and is implemented as a standard UNIX daemon. It provides a full implementation of a WTP server. In addition, WebTopd provides facilities for logging and diagnosis of sessions. It also implements the server-side filtering of requests based on administrator-configured access controls (described earlier).

WebTopd relies on access to a policy configuration database. This database holds client configurations, which are sent back to the client during GETCONFIG requests. It holds the WebTop sessions table, which contains the sessionIDs and SessionHashes used by WebTop. It contains the user and password database, along with the set of policies applied to a given user, as determined by his membership in groups, customers, etc.

The example implementation of WebTopd is in conjunction with the Positive Networks POP-based Network Architecture. As such, it relies on the services provided by that network to service requests. In particular, it relies on Super-NAT services in order to reach destination hosts for GET_URL and TCPTUNNEL_DATA/RECV requests.

APPTunnels Implementation

AppTunnels is implemented by webtopd in order to service WTP client application requests. On receipt of a TCPTUNNEL_START, webtopd builds a TCP connection to the requested destination server. The destination server's IP address is determined by the following process:

webtopd selects the correct DNS server to ask for name resolution out of the policy database, based on the customer that the user is a part of (determined via the sessionID). The internal address of that DNS server is requested from the SuperNAT system The target network server is queried.

Once the connection is built, two activities begin to happen simultaneously. First, a receiving thread is started in WebTopd to read data from the TCP connection and queue RECV messages that will eventually be sent back to the client. At the same time, WebTopd listens for incoming data from the client.

The client connects to WebTopd with either of two messages (or possibly both at the same time, in different client threads): TCPTUNNEL_DATA or RECV. If the message is a RECV request, WebTopd blocks forever until a RECV response is queued by the connection listening thread. It then sends the RECV response back to the client with data. If the message is a TCPTUNNEL_DATA request, the requested data is forwarded on to the client as a response to that request.

GET_URL Implementation

The GET_URL request is implemented very much like a standard HTTP Proxy server. When a GET_URL request comes in, the client follows a similar procedure to the TCPTUNNEL_START procedure to locate and query the correct DNS server. It then connects to the address returned by the query and issues exactly the query contained in the GET_URL request payload. It reads in the response and returns it in the payload of the GET_URL response.

APPTunnels Client

The AppTunnels Client implements the client side of the WTP protocol and provides the Client's half of the AppTunnels functionality. On initialization, the AppTunnels Client is passed its SessionID and SessionHash as parameters. See the previous description of WTP for details concerning these parameters. The AppTunnels Client then performs Proxy Server settings reconfiguration, in the framework of the General Reconfiguration Methodology, described elsewhere in this document.

Proxy Settings Reconfiguration

Proxy Settings Reconfiguration is performed in order to get the user's browser to forward all web requests to the Client. Its first step is to query the current settings. This is browser- and platform-dependent. For Internet Explorer on Microsoft Windows, the Client queries the Windows Registry to obtain current settings. The client stores these settings for use during configuration rollback.

The client then evaluates the settings it has read. If the browser was already configured to use a proxy server, the client knows that it must make a connection to WebTop through a Proxy server, so it selects a proxy-compatible tunnel mode (HTTP1.1 or HTTP/1.0). In this way, the Client is able to auto-detect the proxy configuration and tunnel mode to use.

The client then replaces the browser's configuration information with new settings. These settings instruct the browser to query the Client on a chosen port to ask it for its proxy settings the next time it starts. The Client then establishes itself as a listening server on the selected port.

Launching the Target Application

At this point, the target application is launched. In particular, if the target is the web browser, the web browser is launched with the specified URL passed in as a parameter. Note that some details in this section are based on the Example Implementation, which runs on Microsoft Windows client computers.

When the browser starts, it immediately asks the Client for its proxy settings. The client responds with a Proxy Auto-configuration (PAC) file that contains detailed proxying instructions. Based on those instructions, the browser sends all relevant web requests to the client, which tunnels the requests over the WTP connection and back to the server.

If the target application is not a browser, it is located on the computer. If it is not already installed on the user's computer, it may (depending on policy) prompt the user to take distribution of the application via the Application Distribution System, described elsewhere in this document. If the user agrees, the application is distributed per the previously-discussed process. Otherwise, the user's attempt to launch the application fails.

The AppTunnels client searches the user's computer for the target application in several ways. It takes two specific kinds of hints from the Applications Content module:

Registry-based hints allow the AppTunnels client to query the Windows Registry for specific Registry Keys and Registry Values, whose presence or absence may indicate the presence of the application itself. This process is based on the Application Inventory system, described in conjunction with the Application Distribution system. A Registry hint is in the form of a registry key (fully-qualified or relative) or a registry value. Hints can be optional or required, and can dictate that certain values must be assigned, that the value must exist, that the value must not exist, or any other logical combination.

File-based hints allow the AppTunnels Client to detect, via the presence or absence of files or directories or the contents of files or directories, whether or not an application is installed. These hints may consist of directory paths (fully-qualified or relative), file names, file sizes, file dates, specific contents of files, cryptographic MD5 checksums of the contents of files, or any other logical combination. The file-based fingerprints methodology is described in the Application Inventory section of the Application Distribution system.

Once the application is located on the target computer, it is simply launched, and will connect to the configured port on the Client automatically, as a result of DNS system reconfiguration.

APPENDIX

Additional information about the remote network access systems and methods is provided in the attached appendix.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A system to provide a remote computing client access to resources provided by at least one server in at least one target computing network, comprising:

a point of presence node communicatively configured to connect to the at least one target computing network; and at least one Internet Protocol Security concentrator resident in the point of presence node;

at least one access server resident in the point of presence node, wherein the at least one access server comprises a virtual private network module configured to implement a secure communication channel between the remote computing client and the at least one server in the at least one target communication network, wherein the remote computing client comprises a virtual private network module configured to cooperate with the virtual private network module resident in the point of presence node, wherein the virtual private network module in the remote computing client and the virtual private module in the at least one access server are configured to establish an encrypted communication channel between a specific application executing on the remote computing client and the point of presence node, wherein the virtual private network module in the remote computing client is configured to:

generate a first encryption data set comprising a public portion and a private portion, and transmit the public portion of the first encryption data set to the virtual private network module in the at least one access server in a first session set-up message, wherein the virtual private network module in the at least one access server is configured to:

receive the public portion of the first encryption data set in the first session set-up message, generate a second encryption data set corresponding to the first session set-up message, the second encryption data set comprising a public portion and a private portion, encrypt the public portion of the second encryption data set with a private key of the at least one access server, and transmit the encrypted public portion of the second encryption data set in a second session set-up message, wherein the virtual private network module in the remote computing client further is configured to:

receive the encrypted public portion of the second encryption data set in the second session set-up message, decrypt the encrypted public portion of the second encryption data set, and if decryption is successful, establish a session between the virtual private network module in the remote computing client and the virtual private network module in the at least one access server, wherein the virtual private network module in the at least one access server further is configured to:
  upon establishment of the session between the virtual private network module in the remote computing client and the virtual private network module in the at least one access server, receive an encapsulated network packet, the encapsulated network packet including addressing and network routing information to the server in the target computing network,
  unwrap the encapsulated network packet,
  transmit the unwrapped network packet to the server in the target computing network, the unwrapped network packet being transmitted directly to the server in the target computing network,
  receive a return packet from the target computing network,
  encapsulating the return packet in a tunnel mode message to be sent to the remote computing client, and
  transmit the encapsulated return packet to the remote computing client.

2. The system of claim 1, wherein:
the virtual private network module in the remote computing client communicates with the virtual private network module in the at least one access server using a message exchange mode; and
the virtual private network module in the remote computing client receives application layer data from at least one application executing on the remote computing client.

3. The system of claim 2, wherein the virtual private network module in the at least one access server is configured to implement a proxy client for at least one application executing on the remote computing client.

4. The system of claim 1, wherein the remote computing device further comprises a reconfiguration system module configured to collect system configuration data relating to the remote computing device, generate a system configuration file, and stores the system configuration file in a memory module in the remote computing device.

5. The system of claim 4, wherein the at least one access server comprises:
a central policy manager module configured to establish configuration policies for one or more remote clients that access resources via the virtual private network module; and
a reconfiguration system module configured to cooperate with the reconfiguration system module in the remote computing device to impose configuration changes on the remote computing device.

6. The system of claim 4, wherein the reconfiguration system is configured to implement an atomic reconfiguration process on the remote computing device.

7. The system of claim 4, wherein the remote computing device comprises a client application tunneling module, wherein the client application tunneling module is configured to extract destination IP addresses and port numbers from communication packets and invoke the reconfiguration system module to reconfigure a name-to-address mapping for communications between the remote computing device and an application executing on a remote server.

8. The system of claim 1, wherein the remote computing device comprises a local proxy module that emulates an HTTP proxy server.

9. The system of claim 1, wherein at least one server in the point of presence node comprises a network address translation module configured to perform network address translation on incoming and outgoing packets to enable remote access to resources on one or more networks outside the at least one target computing network.

10. The system of claim 9, wherein the network address translation module is configured to automatically determine a network configuration for the at least one target computing network.

11. The system of claim 1, wherein:
the at least one access server comprises a first network backup module;
the remote computing client comprises a second network backup module; and
the first network backup module and the second network backup module are configured to back up and restore one or more files from the at least one server.

12. The system of claim 11, wherein the first network backup module is configured to maintain incremental backups of files used by the remote computing client.

13. A system comprising:
at least one access server including a virtual private network module configured to implement a secure communication channel between a virtual private network module resident in a remote computing client and the at least one access server,
wherein the virtual private network module in the at least one access server is configured to:
  receive, from the virtual private network module resident in the remote computing client, a public portion of a first encryption data set in a first session set-up message,
  generate a second encryption data set corresponding to the first session set-up message, the second encryption data set comprising a public portion and a private portion,
  encrypt the public portion of the second encryption data set with a private key of the at least one access server, and
  transmit, to the virtual private network module resident in the remote computing client, the encrypted public portion of the second encryption data set in a second session set-up message, and
  if decryption of the encrypted second public portion of the second encryption data set is successful, establish a session with the virtual private network module in the remote computing client,
  upon establishment of the session with the virtual private network module in the remote computing client, receive an encapsulated network packet, the encapsulated network packet including addressing and network routing information to a server in the target computing network,
  unwrap the encapsulated network packet,
  transmit the unwrapped network packet to the server in the target computing network, the unwrapped network packet being transmitted directly to the server in the target computing network,
  receive a return packet from the target computing network,
  encapsulating the return packet in a tunnel mode message to be sent to the remote computing client, and
  transmit the encapsulated return packet to the remote computing client.

* * * * *